US012078306B2

(12) United States Patent
Ring et al.

(10) Patent No.: US 12,078,306 B2
(45) Date of Patent: Sep. 3, 2024

(54) LINEAR LED LUMINAIRE HOUSING FOR USE IN HARSH AND HAZARDOUS LOCATIONS

(71) Applicant: Eaton Intelligent Power Limited, Dublin (IE)

(72) Inventors: Christopher Ring, Derry, NH (US); Christopher G. Henley, Pittsburgh, PA (US); Arkadiusz Oskar Doroz, Syracuse, NY (US); Virginia Merriam, Clay, NY (US); Gangadhar Mestri, Dharwad (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/811,322

(22) Filed: Jul. 8, 2022

(65) Prior Publication Data

US 2023/0010234 A1 Jan. 12, 2023

Related U.S. Application Data

(60) Provisional application No. 63/220,127, filed on Jul. 9, 2021.

(51) Int. Cl.
*F21S 4/28* (2016.01)
*F21V 17/10* (2006.01)
(Continued)

(52) U.S. Cl.
CPC .............. *F21S 4/28* (2016.01); *F21V 17/107* (2013.01); *F21V 17/18* (2013.01); *F21V 19/003* (2013.01);
(Continued)

(58) Field of Classification Search
CPC .......... F21S 4/28; F21V 17/107; F21V 17/18; F21V 19/003; F21V 19/0035;
(Continued)

(56) References Cited

U.S. PATENT DOCUMENTS 4,390,114 A * 6/1983 Sviatoslavsky ......... F21V 17/12
220/836
5,440,466 A * 8/1995 Belisle .................... F21V 23/02
362/225
(Continued)

FOREIGN PATENT DOCUMENTS

AT 16061 U1 * 12/2018 .............. F21V 15/01
AU 2009101104 A4 12/2009
(Continued)

OTHER PUBLICATIONS

U. Knoche and K.H. Latka, "Module For Modular Outdoor Light", Sep. 14, 2017, Deutsches Patent—und Markenamt, Machine English translation text of "DE 102016104426 A1", text merged with pp. 1-18 of image. (Year: 2017).*
(Continued)

*Primary Examiner* — Alan B Cariaso
(74) *Attorney, Agent, or Firm* — Pearne & Gordon LLP

(57) ABSTRACT

A linear light fixture for use in a hazardous environment, the linear light fixture includes a housing body that defines a component compartment therein that is configured to receive electrical components. The linear light fixture also includes a light engine connected to the housing body and including a light emitting diode. The light engine is pivotable with respect to the housing body between a first position, wherein the light engine encloses the component compartment, and a second position, wherein access is provided to the component compartment. The light engine is separable from the housing body.

18 Claims, 19 Drawing Sheets

(51) Int. Cl.

| | |
|---|---|
| ***F21V 17/18*** | (2006.01) |
| ***F21V 19/00*** | (2006.01) |
| ***F21V 19/04*** | (2006.01) |
| ***F21V 21/40*** | (2006.01) |
| ***F21V 23/00*** | (2015.01) |
| ***F21V 31/00*** | (2006.01) |
| ***F21Y 103/10*** | (2016.01) |
| ***F21Y 115/10*** | (2016.01) |

(52) U.S. Cl.
CPC .............. *F21V 19/04* (2013.01); *F21V 21/40* (2013.01); *F21V 23/002* (2013.01); *F21V 31/005* (2013.01); *F21Y 2103/10* (2016.08); *F21Y 2115/10* (2016.08)

(58) Field of Classification Search
CPC .... F21V 19/004; F21V 19/0045; F21V 19/04; F21V 23/001; F21V 23/002; F21V 31/00; F21V 31/005; F21V 21/40; F21V 21/406; F21Y 2103/10; F21Y 2103/20
See application file for complete search history.

(56) References Cited

U.S. PATENT DOCUMENTS 6,276,818 B1 * 8/2001 Wang ...................... E05C 19/06 362/147
6,853,151 B2 2/2005 Leong et al.
7,997,761 B2 8/2011 Peck et al.
8,764,243 B2 7/2014 Zimmer et al.
8,864,332 B2 10/2014 Ter-Hovhannisyan
9,410,686 B2 8/2016 Burmeister et al.
9,541,272 B2 1/2017 Burmeister et al.
10,584,831 B2 3/2020 Honda et al.
2006/0152921 A1 * 7/2006 Welker .................. F21V 17/107 362/147
2010/0061094 A1 3/2010 Ijzerman et al.
2012/0161666 A1 6/2012 Antony et al.
2014/0268830 A1 * 9/2014 Boyer ................... F21V 19/005 362/382
2015/0192261 A1 7/2015 May
2015/0267873 A1 * 9/2015 Price ......................... F21K 9/27 362/432
2016/0003455 A1 * 1/2016 Muchandi ............. F21V 7/0066 362/235
2019/0063729 A1 * 2/2019 Vang ..................... F21V 17/107
2019/0093875 A1 3/2019 Ter-Hovhannisyan

FOREIGN PATENT DOCUMENTS

CN 207962344 U 10/2018
DE 102016104426 A1 * 9/2017
EP 1376004 A2 * 1/2004 ............ F21V 17/164
JP 2012199219 A * 10/2012 .............. F21V 15/01
KR 101486292 B1 * 1/2015
KR 101576872 B1 12/2015
KR 102120358 B1 6/2020
KR 200492420 Y1 10/2020
WO WO-2012157104 A1 * 11/2012 ................ F21S 8/02
WO WO-2015063807 A1 * 5/2015 ................ F21S 8/08
WO 2019220132 A1 11/2019

OTHER PUBLICATIONS

Y.I. Chung, "LED Tunnel Lighting", Jan. 28, 2015, Machine English translation text of "KR 101486292 B1", text merged with pp. 1-12 of image. (Year: 2015).*
Miyagawa / Kawachi et al., "Lighting System", Oct. 18, 2012, Document ID JP 2012199219 A, Machine English translation text merged with original image document JP 2012199219 A. (Year: 2012).*
Spiegel / Feurle et al., "Luminaire With Two Housing Parts", Dec. 15, 2018, Document ID AT 16061 U1, Machine English translation text merged with Image document AT 16061 U1. (Year: 2018).*
Y. Takahashi et al., "Lighting Device", Nov. 22, 2012, Document ID WO 2012157104 A1, Machine English translation text merged with Image document WO 2012157104 A1. (Year: 2012).*
Zumtobel Lighting GmbH, "Luminaire With Two Housing Parts", Oct. 25, 2017, Document ID DE 202016103954 U1, Machine English translation text merge with image document DE 20 2016 103 954 U1 (Year: 2017).*
International Search Report issued in corresponding application No. PCT/EP2022/025322 dated Oct. 25, 2022, 5 pages.
Written Opinion issued in corresponding application No. PCT/EP2022/025322 dated Oct. 25, 2022, 5 pages.

* cited by examiner

LINEAR LED LUMINAIRE HOUSING FOR USE IN HARSH AND HAZARDOUS LOCATIONS

FIELD

The subject application relates to linear light fixtures (e.g. luminaires). More particularly, a housing for a linear light fixture, which may include light emitting diodes (LEDs), and that can be used in harsh and hazardous locations is provided.

BACKGROUND

Linear light fixtures (e.g. fluorescent tube light fixtures) can be used in a variety of applications to provide various forms of lighting. For example, linear light fixtures may be employed in different locations to provide general lighting for visibility. In some instances, a linear light fixture may be mounted to a ceiling to illuminate an interior area of a building or other enclosure. Other environments requiring linear lighting include those that are outdoors such as in partial enclosures or areas which are fully exposed to weather or various artificial conditions produced by related machinery or equipment.

SUMMARY OF THE INVENTION

In accordance with one aspect, there is provided a linear light fixture for use in a hazardous environment. The linear light fixture comprises a housing body defining a component compartment therein configured to receive electrical components. A light engine is connected to the housing body and includes a light emitting diode. The light engine is pivotable with respect to the housing body between a first position, wherein the light engine encloses the component compartment, and a second position, wherein access is provided to the component compartment. The light engine is separable from the housing body.

In one embodiment, the light engine includes a sealed housing for isolating the light emitting diode from the hazardous environment.

In one embodiment, a hinge is provided at a side of the housing body and defines a pivot axis.

In one embodiment, the light engine includes a plate, and a hinge pin is provided at a side of the plate.

In one embodiment, the hinge pin is removably received within the hinge such that the light engine is pivotable about the pivot axis between the first position and the second position.

In one embodiment, the hinge pin is integral with the plate and is defined by a through-hole formed in the plate and disposed adjacent thereto.

In one embodiment, the hinge includes a vertical portion extending from the housing body and a curved portion at a distal end thereof, wherein the vertical portion of the hinge extends within the through-hole formed in the plate when the light engine is in the first position, and wherein the curved portion partially wraps around the hinge pin.

In one embodiment, the plate includes opposite first and second surfaces, the light emitting diode being provided on the first surface, and the second surface facing the component compartment when the light engine is in the first position.

In one embodiment, the light engine includes a plate having first and second opposite sides, wherein the first side of the light engine is pivotably connected to the housing body, and wherein a notch is formed at the second side.

In one embodiment, the housing body includes a latching tab extending outwards therefrom.

In one embodiment, when the light engine is in the first position, the latching tab is received within the notch formed at the second side of the plate.

In one embodiment, the notch is a cut-out formed at an edge of the second side of the plate.

In one embodiment, the linear light fixture further comprises a latch secured to the plate, the latch and the notch collectively defining a pocket, wherein the pocket is configured to receive a protrusion of the latching tab.

In one embodiment, the latch is resiliently movable such that as the light engine pivots from the second position to the first position, the latch is moved away from the plate via a force imparted by the protrusion of the latching tab.

In one embodiment, the housing body includes opposite first and second sides extending longitudinally between opposite first and second ends thereof, wherein the light engine is pivotably attached to the housing body at the first side thereof.

In one embodiment, a first handle is provided at one of the first and second sides of the housing body.

In one embodiment, a second handle is provided at the other of the first and second sides of the housing body.

In one embodiment, the light engine is selectively locked in the first position via a latch such that the latch prevents the light engine from pivoting towards the second position.

In one embodiment, a hollow hub is provided at one of the first and second ends of the housing body and is configured to receive an electrical conduit therein.

In accordance with another aspect, there is provided a linear light fixture for use in a hazardous environment. The linear light fixture includes a housing body extending along a longitudinal axis and defining a component compartment therein. The component compartment is configured to receive electrical components. The housing body includes first and second opposite sides extending along the longitudinal axis between first and second opposite ends of the housing body. A hinge is provided at the first side of the housing body and defines a pivot axis. A latching tab is provided at the second side of the housing body.

The linear light fixture also includes a light engine removably connected to the housing body. The light engine includes a plate having first and second opposite sides extending between first and second opposite ends thereof, wherein a notch is formed at the second side of the plate. A light emitting diode is provided on a first surface of the plate, and a hinge pin is provided at the first side of the plate.

The hinge pin is removably received within the hinge such that the light engine is pivotable about the pivot axis between a first position, wherein the plate encloses the component compartment, and a second position, wherein access is provided to the component compartment. When the light engine is in the first position, the latching tab is received within the notch. The plate includes a second surface, opposite to the first surface, that faces the component compartment when the light engine is in the first position.

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein.

Figure 1:
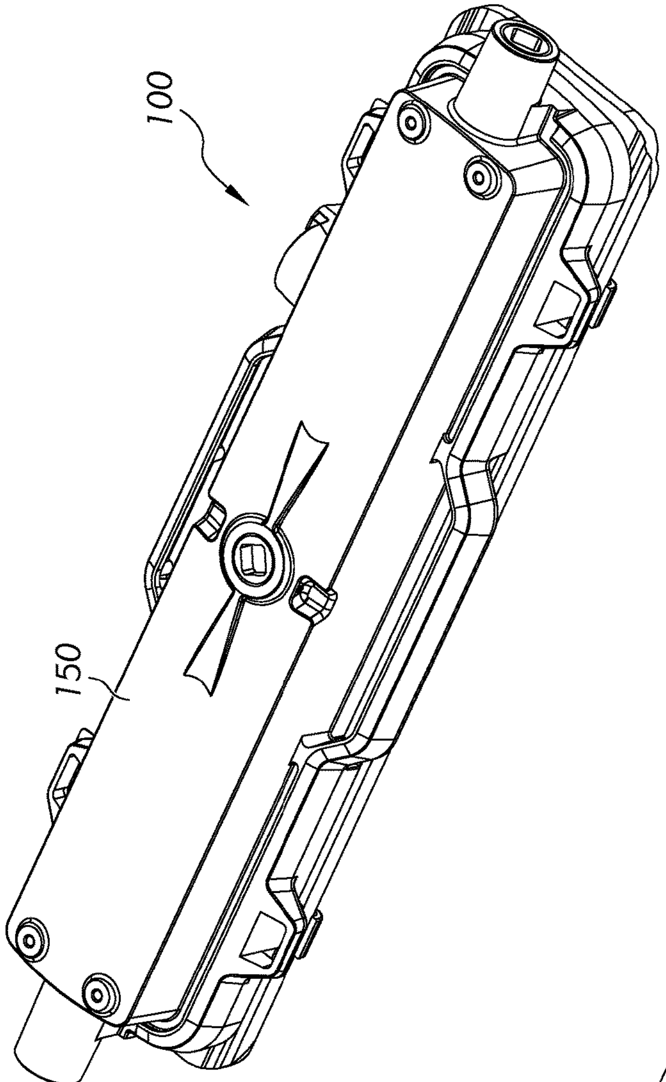
FIG. 1 is top perspective view of an example linear light fixture, according to a first embodiment.
Figure 2:
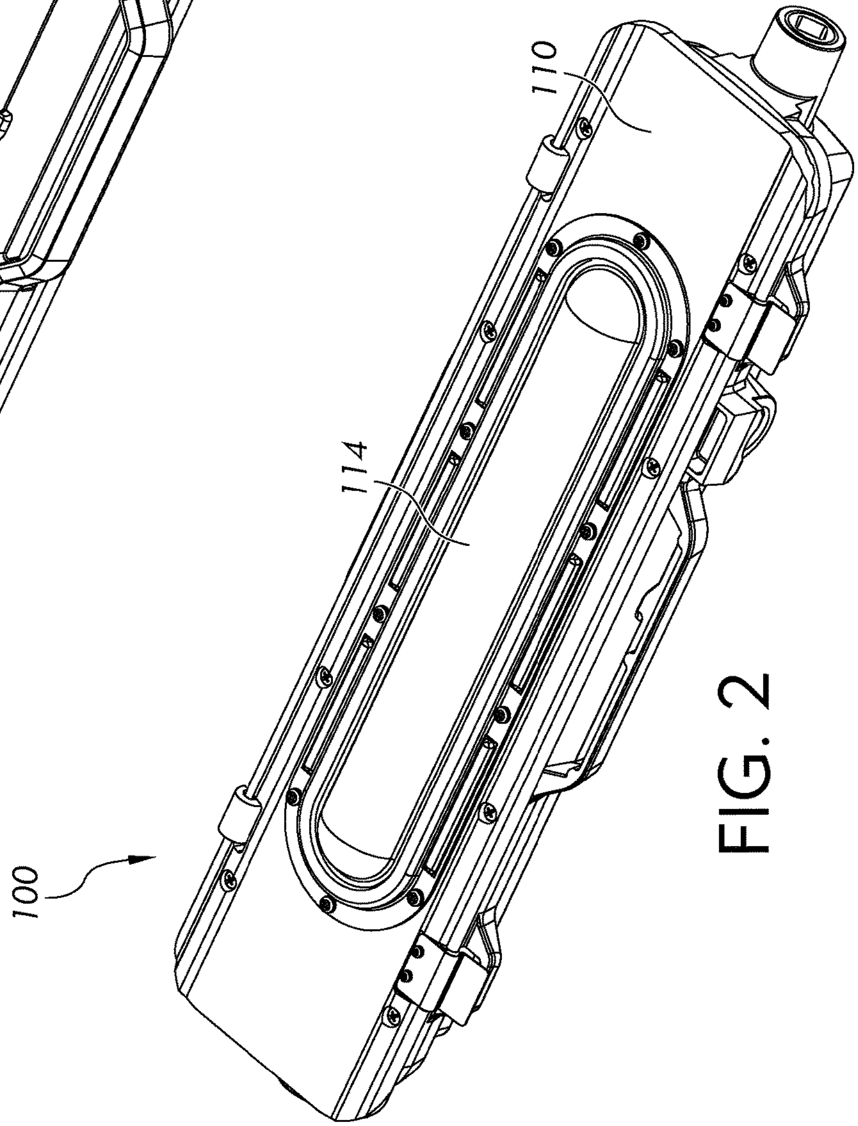
FIG. 2 is a bottom perspective view of the linear light fixture of FIG. 1.
Figure 3:
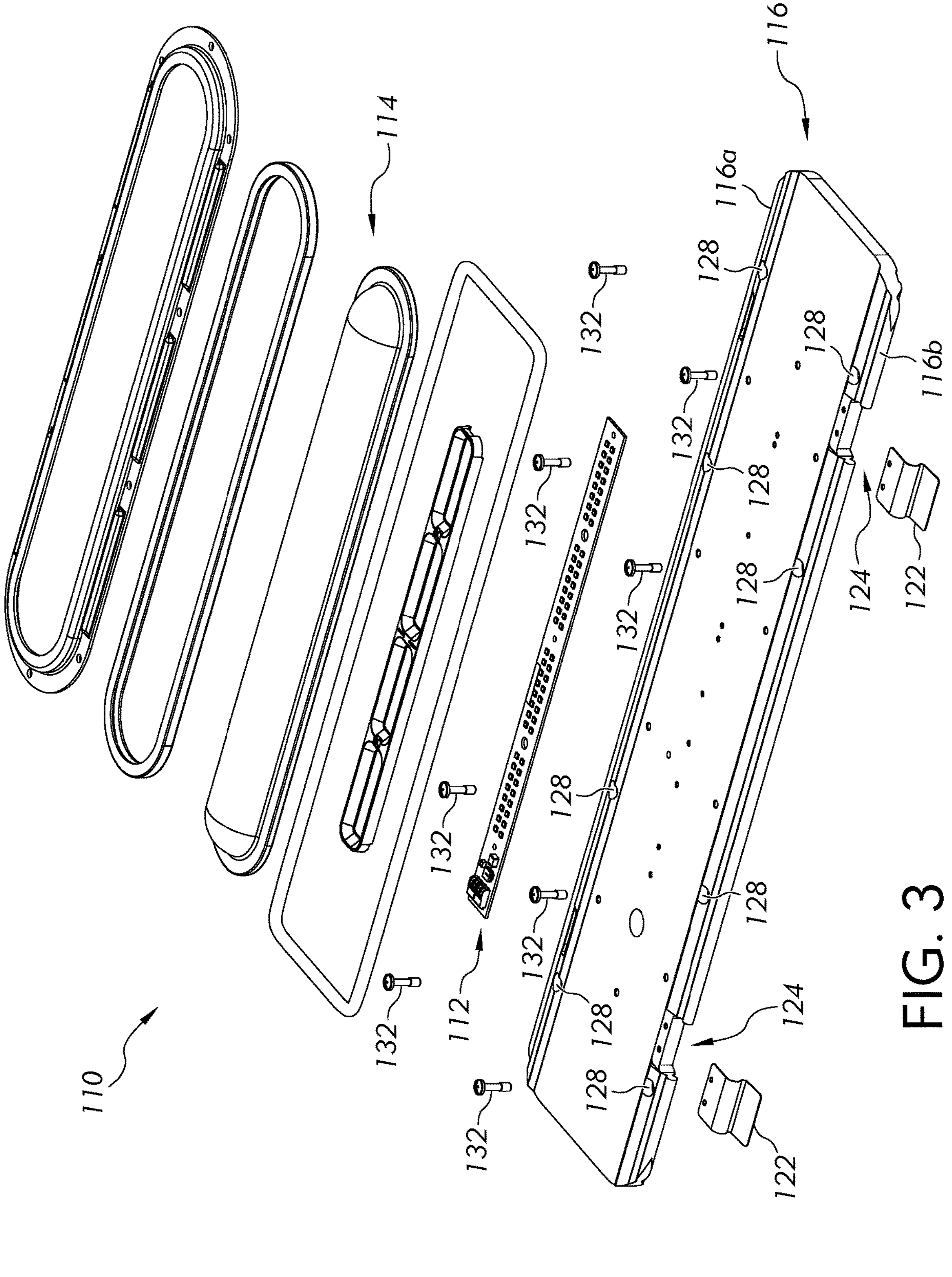
FIG. 3 is an exploded perspective view of a light engine, according to a first embodiment, of the linear light engine of FIG. 1.

As shown in FIGS. 1 and 2, a first example linear light fixture 100 includes a housing body 150 onto which a first example light engine 110 is mounted. Referring to FIG. 3, the light engine 110 may include semiconductor light emitting diodes (LEDs) 112 that produce light when electrically powered are located behind a lens 114. It is to be understood that, although LEDs are described herein as a light producing or light emitting source, other light producing or light emitting sources, including those not explicitly described herein, could also be used and are considered to be within the scope of the disclosure. For example, other solid state electroluminescence lighting sources, such as organic light emitting diodes (OLEDs) or polymer light emitting diodes (PLEDs) can also be used as a source of illumination and are considered to be within the scope of the disclosure. In addition, one or more incandescent light bulbs that include an electric filament that produces light when electrified as well as one or more fluorescent bulbs that produces light based at least in part on the electrification and illumination of a plasma or gas can also be used as a source of illumination and are considered to be within the scope of the disclosure. It is contemplated that the light engine 110 may be a sealed replaceable unit so that a user may replace one light engine with another, if desired.

Figure 4:
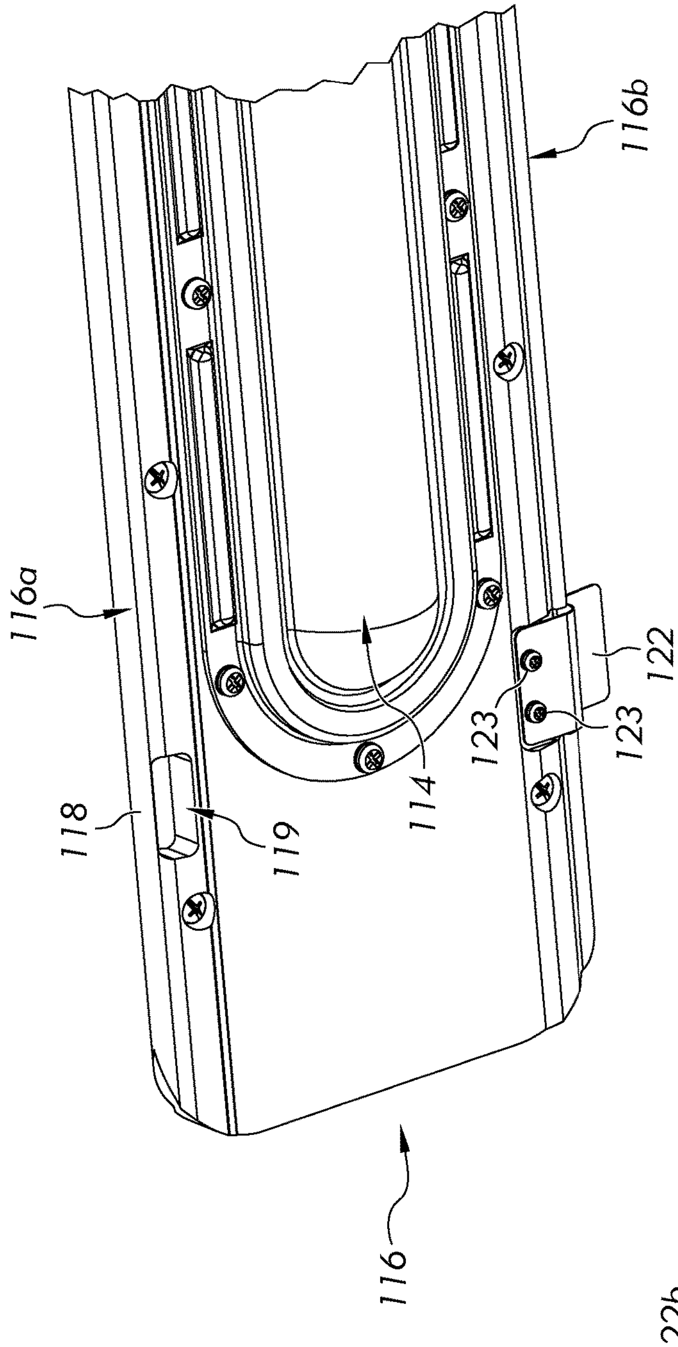
FIG. 4 is an enlarged top perspective view of one end of the light engine of FIG. 3.

The light engine 110 includes a plate 116 whereon the components of the light engine 110 are mounted. The plate 116 includes a plurality of mounting holes for receiving fasteners that secure the various components of the light engine 110 to the plate 116. It is contemplated that the light engine 110 may include a sealed housing, e.g., the lens 114 so that the electrical components of the light engine 110 are isolated from the surrounding environment. Referring to FIG. 4, two hinge pins 118 (only one of which is shown in FIG. 4) are formed along a first side 116*a* of the plate 116. In the embodiment illustrated, the hinge pins 118 are formed by pockets 119 that extend through the plate 116 near the edge of the first side 116*a*. In this respect, the hinge pins 118 are integral with the plate 116, i.e., the plate 116 and the hinge pins 118 are formed from one single body, e.g., by casting or machining a single plate. It is contemplated that the hinge pins 118 may be separate components that are attached to the plate 116 using customary fasteners (not shown). The hinge pins 118 are dimensioned and position axial align with each other, as described in detail below.

Figure 5:
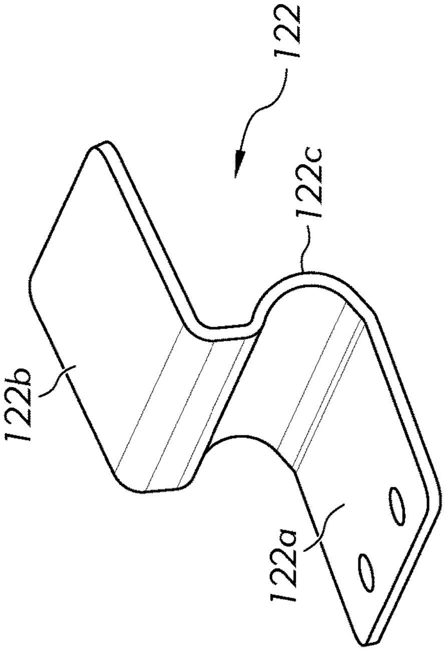
FIG. 5 is an enlarged perspective view of a latch of the light engine of FIG. 3.

Referring back to FIG. 3, two latches 122 are attached to a second side 116*b* of the plate 116 that is opposite the first side 116*a*. The latches 122 are secured to the plate via fasteners 123 (FIG. 4). Referring to FIG. 5, each latch 122 includes a first leg 122*a* and a second leg 122*b* and a central section 122*c*. The first leg 122*a* includes holes of receiving the fasteners 123 (FIG. 4) that secure the latch 122 to the plate 116. The central section 122*c* is S-shaped and includes one end attached to the first leg 122*a* and an opposite end attached to the second leg 122*b*. The central section 122*c* is configured to provide a clamping force for securing the plate 116 to the housing body 150, as described in detail below. The latch 122 may be made from metal to allow the latch 122 to slightly deflect when a force is applied to the second leg 122*b*. The latch 122 will return to its original shape when the force is removed.

Figure 6:
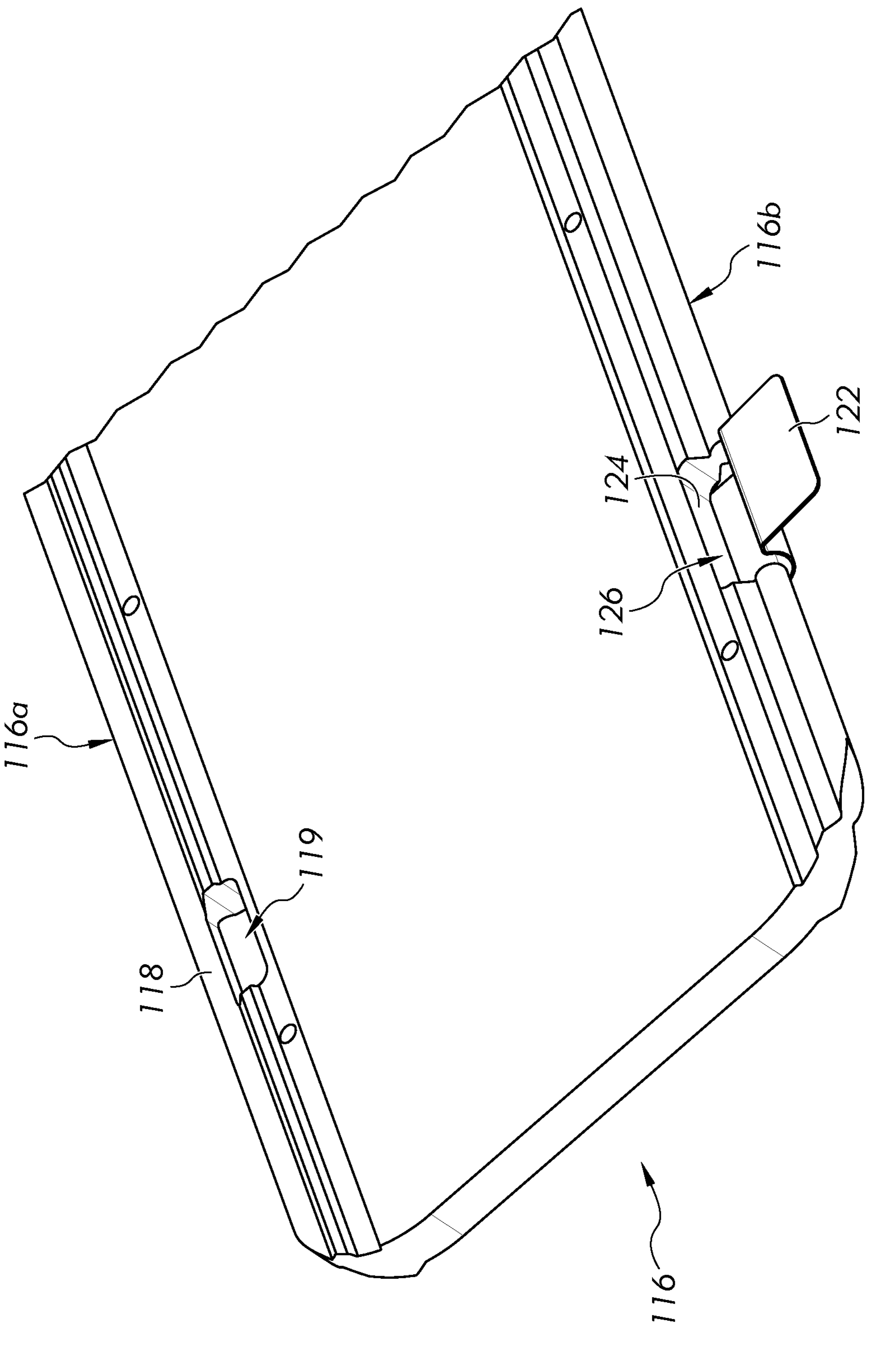
FIG. 6 is an enlarge top perspective view of one end of the light engine of FIG. 3.

Referring to FIG. 3, two notches 124 are formed in the second side 116*b* of the plate 116. As illustrated in FIG. 6, one of the latches 122 is mounted to the plate 116 adjacent each notch 124. The notch 124, the first leg 122*a* (FIG. 5) and the central section 122*c* (FIG. 5) of the latch 122 define a pocket 126 that is dimensioned and positioned as described in detail below.

Referring back to FIG. 3, a plurality of holes 128 are positioned about a periphery of the plate 116. The holes 128 are dimensioned to receive fasteners 132. In the embodiment illustrated there are eight holes 128 and fasteners 132. It is contemplated that there may be more or fewer holes as needed to secure the plate 116 to the housing body 150. The fasteners 132 are illustrated as being captive screws that, after being inserted into their respective holes 128 remain in the respective holes 128 of the plate 116 after unthreading from respective holes 188 in the housing body 150, as described in detail below. It is contemplated that a plurality of corresponding locking or non-locking washers (not shown) may be placed between the fasteners 132 and the surface of the plate 116 to secure the fasteners 132 to the plate 116 during assembly.

Figure 7:
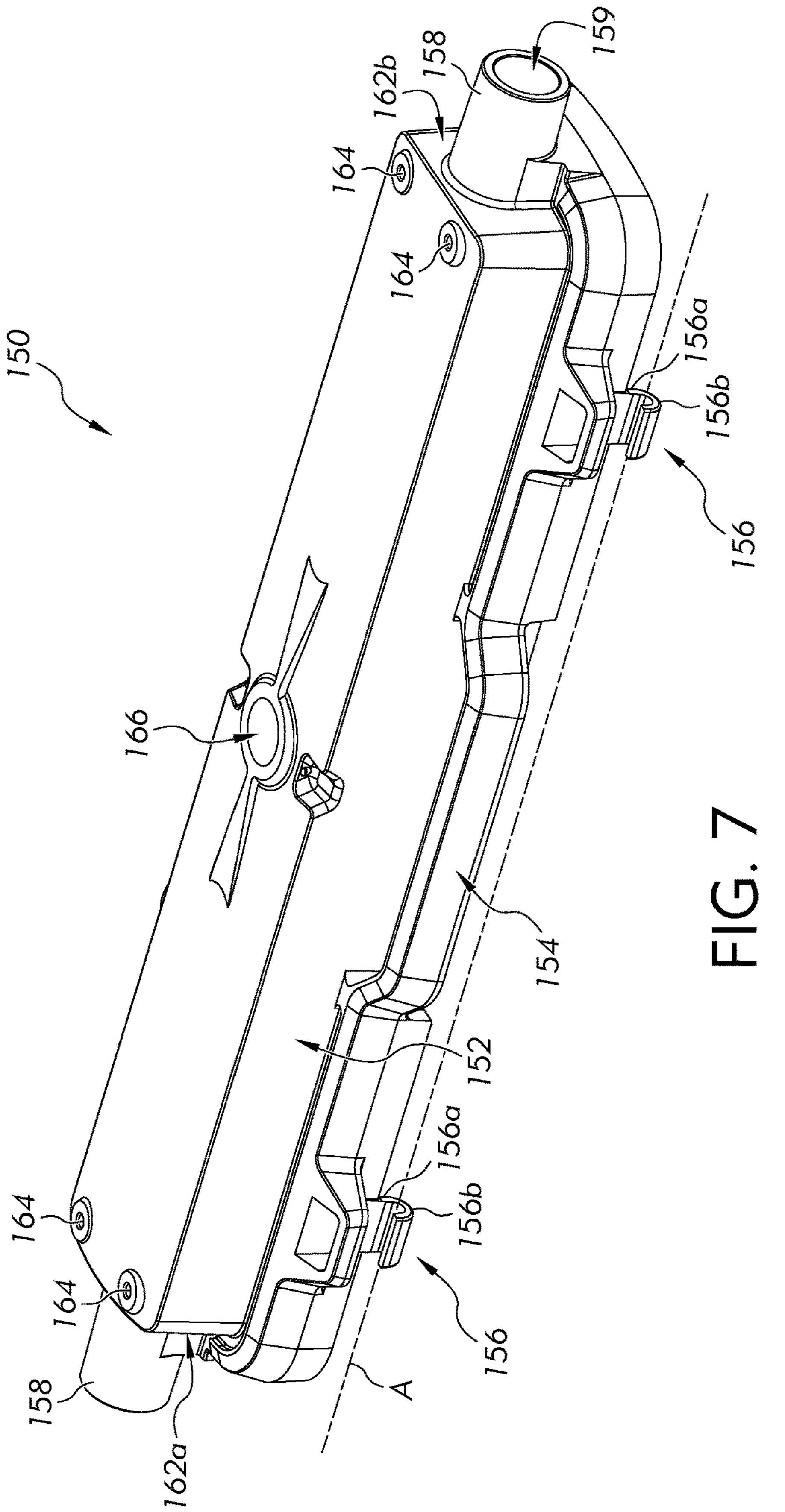
FIG. 7 is a perspective view of a first or hinge side of a housing of the linear light fixture of FIG. 1.

Referring now to FIG. 7, a first side 152 of the housing body 150 is shown. The first side 152 is also referred to as a hinge side of the housing body 150. A handle 154 is formed on a side surface of the first side 152. The handle 154 is illustrated as being integral with the outer surface of the housing body 150. It is contemplated that the handle 154 may be a separate component that is attached to the housing body 150 via fasteners (not shown). The handle 154 is configured and sized so that the hand of an average person can comfortably grip the handle 154 and carry the housing body 150.

A hinge 156 is located near each end of the handle 154. Each hinge 156 is J-shaped and includes a vertical portion **156*a* and a curved lower end 156*b* that opens outwardly from the first side 152 of the housing body 150. The hinges 156 are positioned and configured to axially align with each along a pivot axis A of the housing body 150**.

Figure 9:
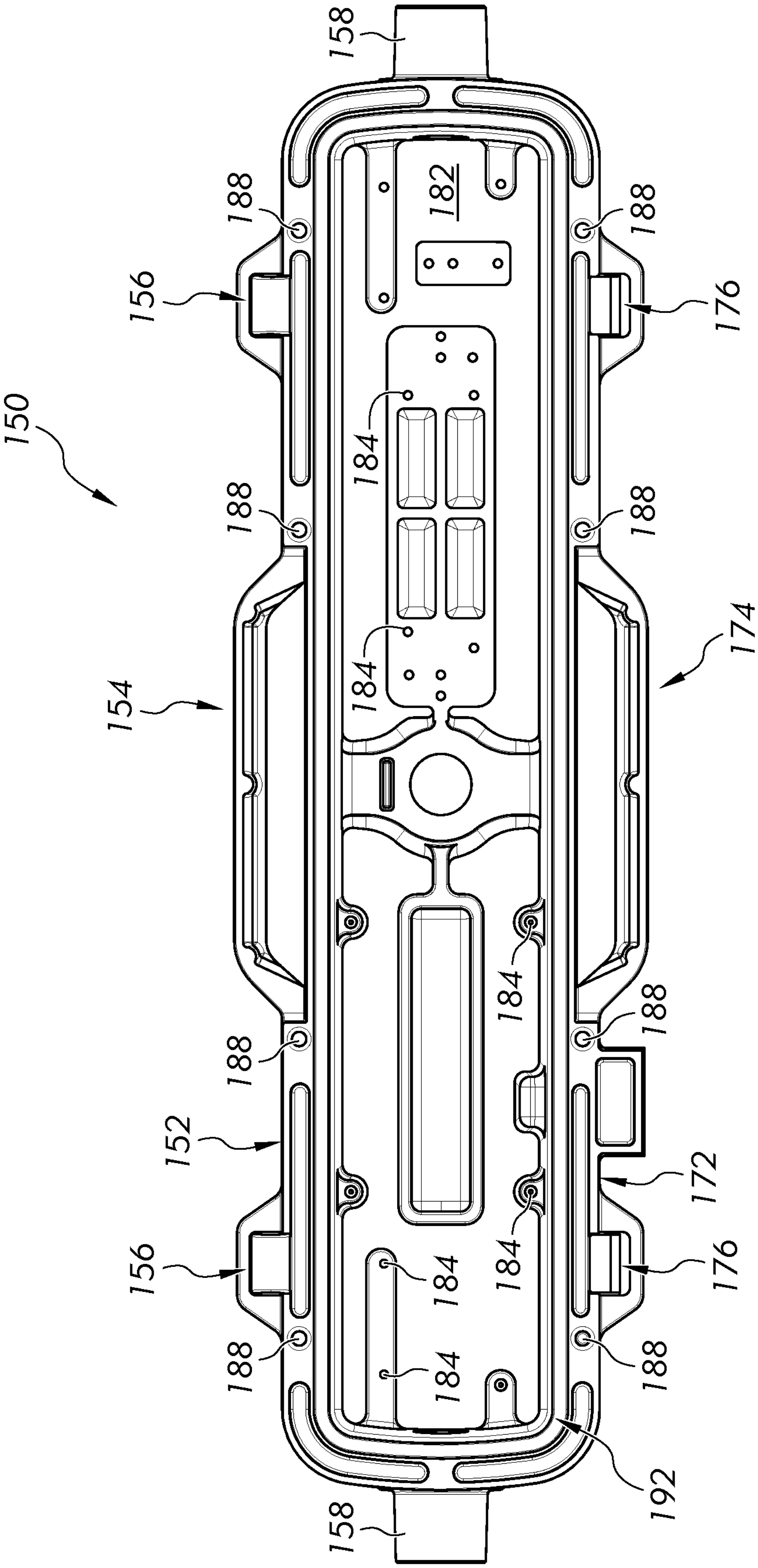
FIG. 9 is a bottom view of the housing of the linear light fixture of FIG. 7.

A hub 158 is disposed at each end **162*a*, 162*b* of the housing body 150. Each hub 158 includes threaded hole 159. A plug 161 (FIG. 11) may be treaded into each threaded hole 159 when no other component is threaded into the hole 159. It is also contemplated that the holes 159 may receive electrical conduit (not shown) wherein electrical cables pass through the electrical conduit into a component compartment 182 (FIG. 9**).

Mounting holes 164 are disposed on a top surface of the housing body 150 at each end **162*a*, 162*b*. The mounting holes 164 are provided in pairs for allowing brackets 210, 212, 218 (FIGS. 15A, 15B, 15E) to be mounted to the housing body 150**, as described in detail below.

Figure 11:
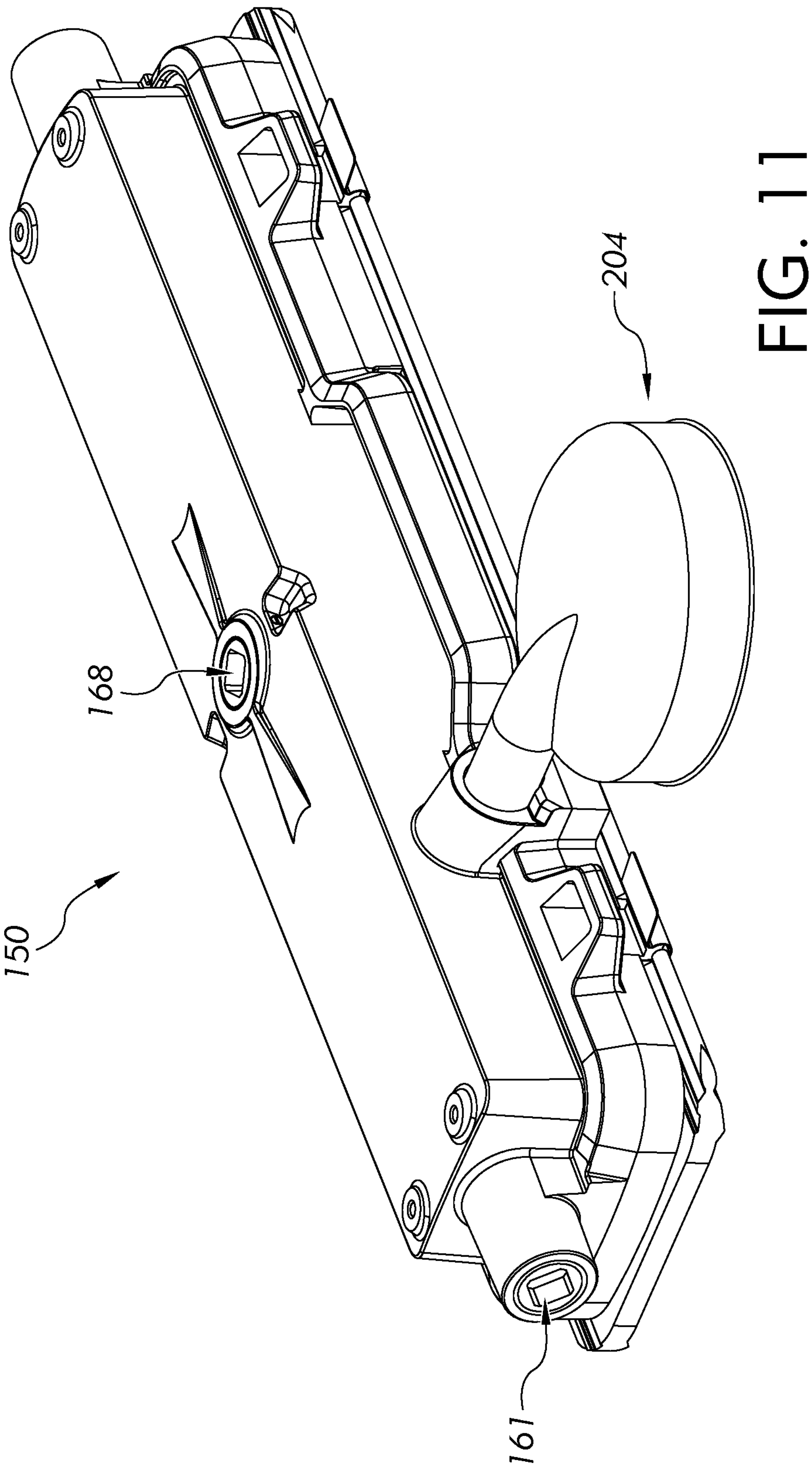
FIG. 11 is a side perspective view of the linear light fixture of FIG. 1, showing a component attached to a side of the housing.
Figure 12B:
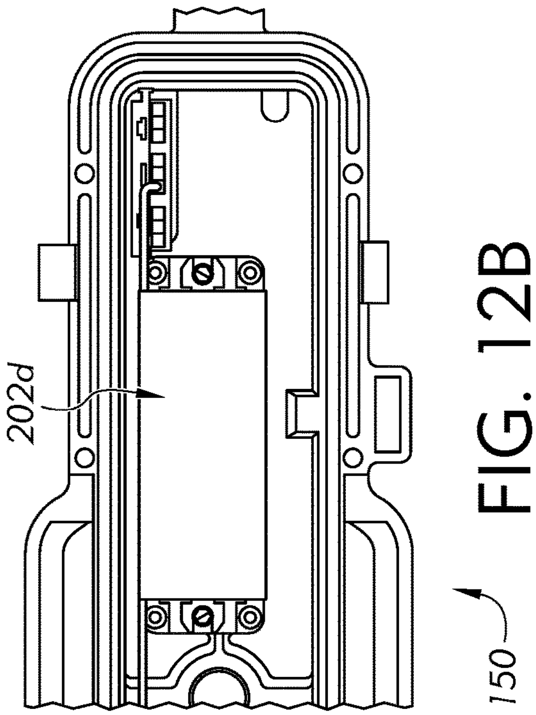
FIGS. 12A-12D illustrate various components disposed in a component compartment of the linear light fixture of FIG. 1.
Figure 12D:
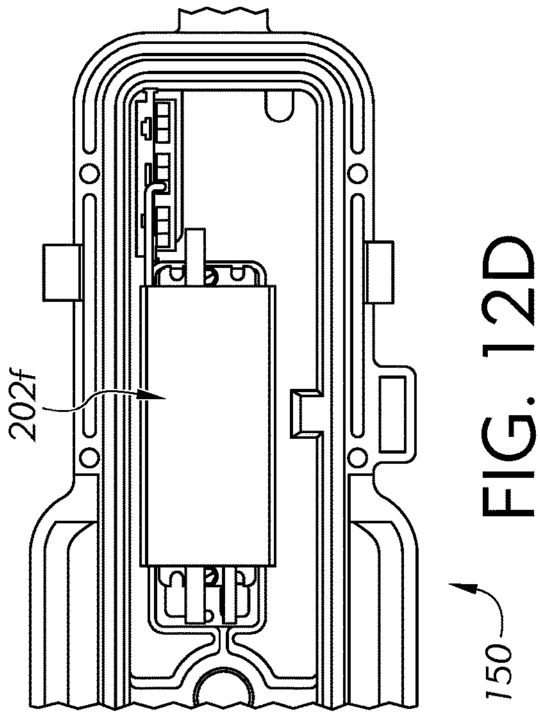
Figure 12A:
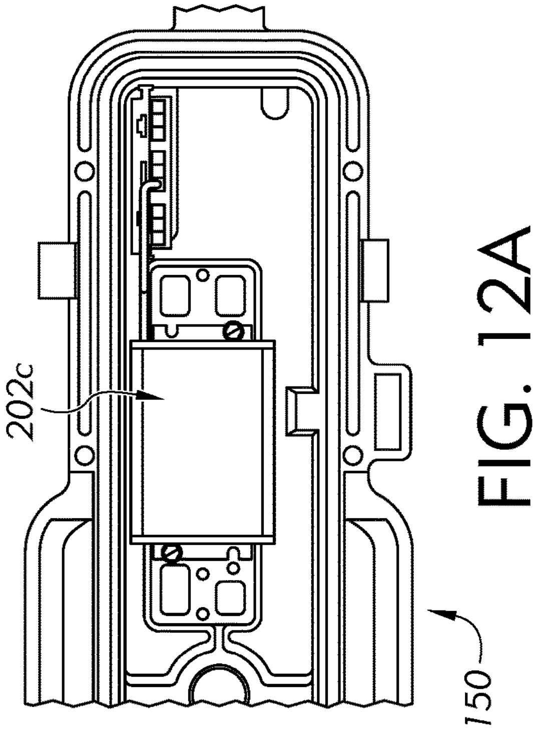
Figure 12C:
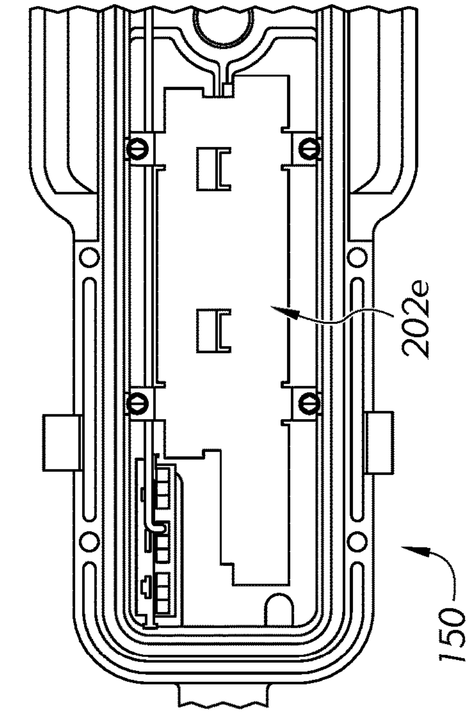

A threaded opening 166 extends through the top surface at a location mid-way between the ends **162*a*, 162*b* of the housing body 150. The threaded opening 166 extends through the housing body 150 into the component compartment 182 (FIG. 9) and defines a mounting location for a threaded conduit 224 (FIG. 15D), as described in detail below or a plug 168 (FIG. 11**).

Figure 8:
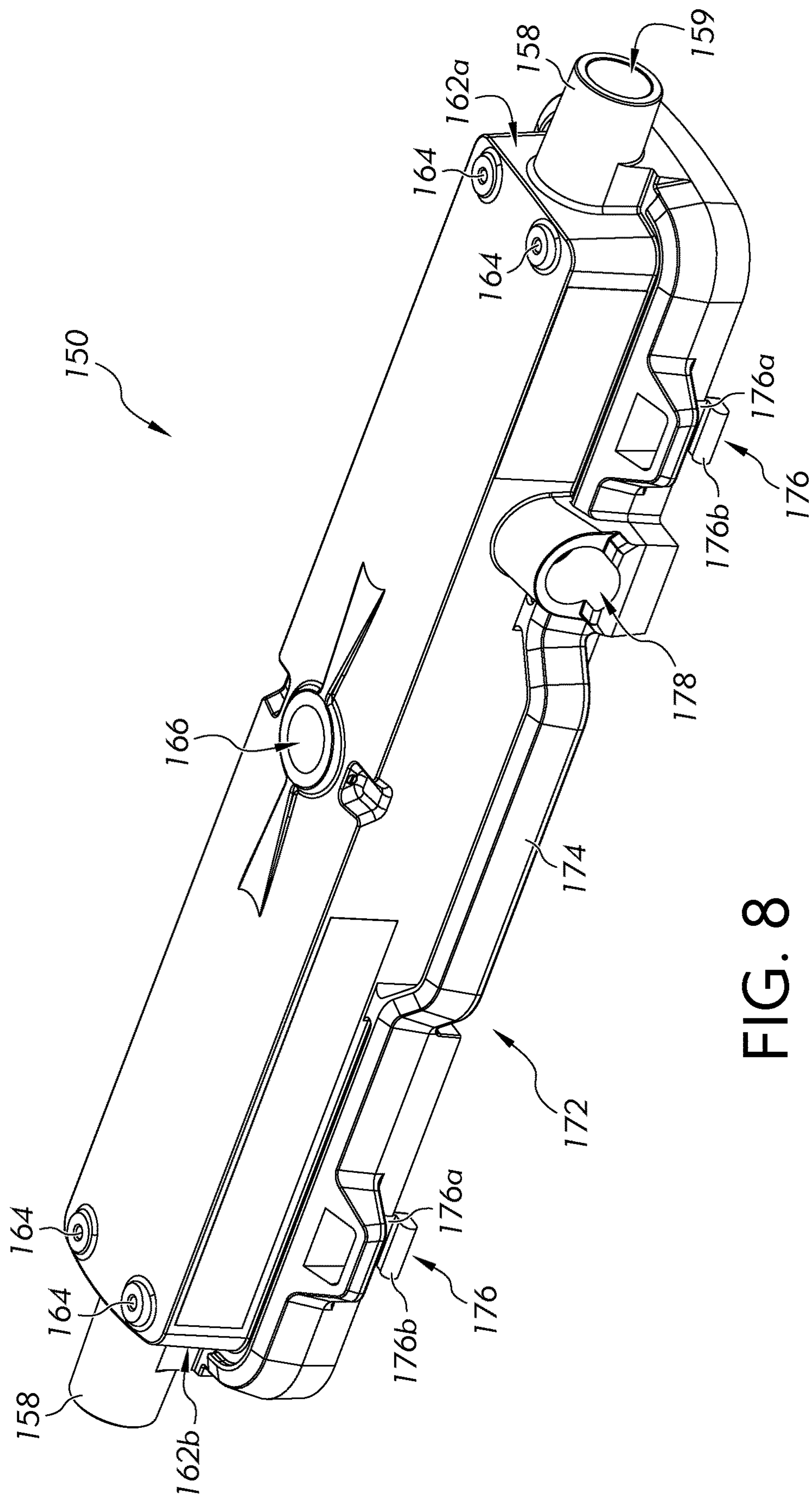
FIG. 8 is a perspective view of a second or latch side of the housing of the linear light fixture of FIG. 7.

Referring now to FIG. 8, a second side 172 of the housing body 150 is shown and is referred to as a latch side of the housing body 150. A handle 174 is formed on a side surface of the second side 172. The handle 174 is illustrated as being integral with the outer surface of the housing body 150. It is contemplated that the handle 174 may be a separate component that is attached to the housing body 150 via fasteners (not shown). Similar to the handle 154, the handle 174 is configured and sized so that the hand of an average person can comfortably grip the handle 174 and carry the housing body 150.

A latching tab 176 is located near each end of the handle 174. Each latching tab 176 includes a vertical portion **176*a* and a protrusion 176*b* extending outwardly from a distal end of the vertical portion 176*a*. In the embodiment illustrated, the protrusion 176*b* has a curved outer surface and is dimensioned to engage the central section 122*c* of the latch 122**, as described in detail below.

A mounting port 178 is disposed on the second side 172 of the housing body 150 between one end of the handle 174 and the latching tab 176. The mounting port 178 is provided for allowing a component 204 (FIG. 11) to be mounted to the housing body 150, as described below.

Figure 10:
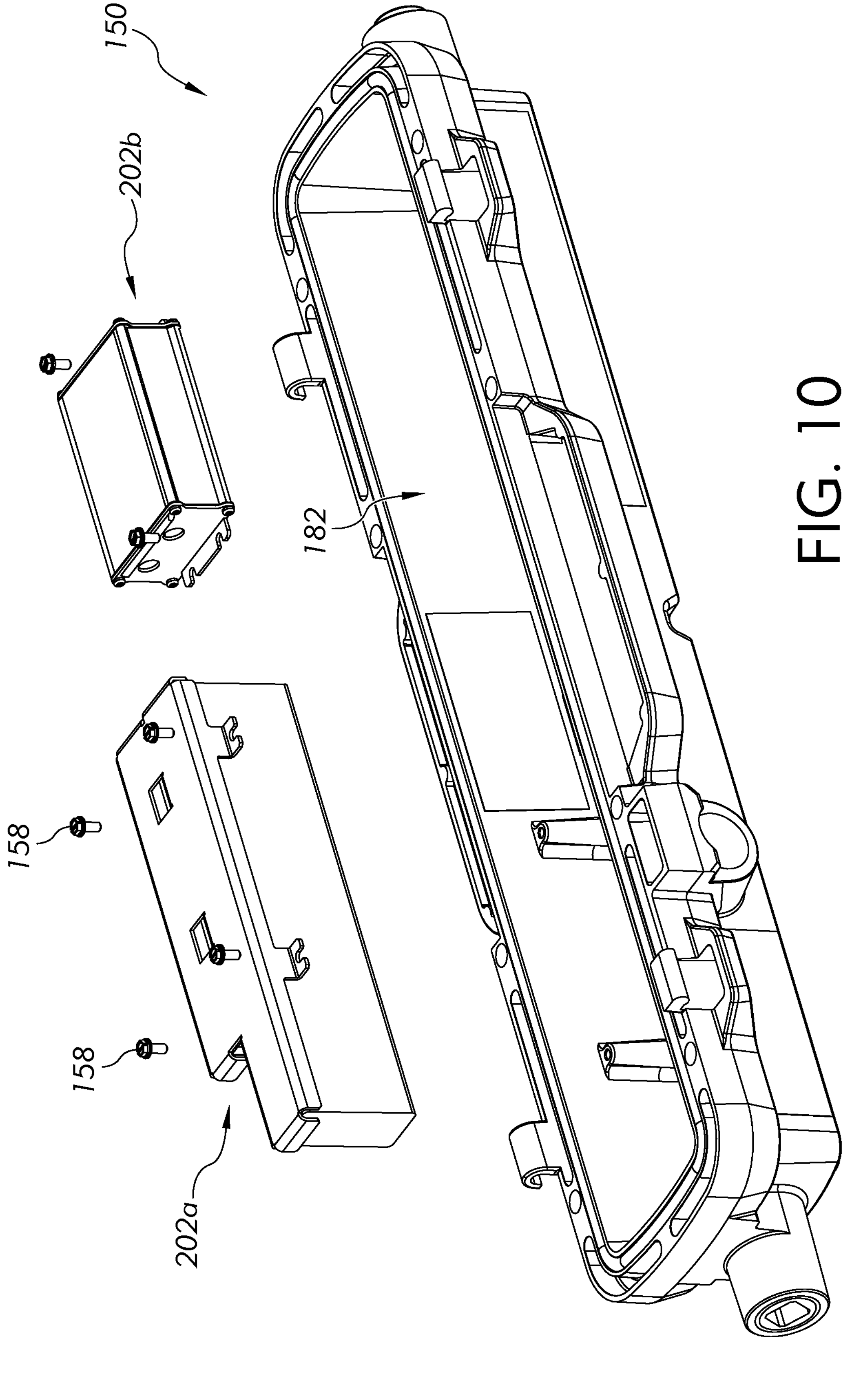
FIG. 10 is an exploded view of the linear light fixture of FIG. 1, showing a plurality of components.

Referring to FIG. 9, a component compartment 182 is formed in a lower surface of the housing body 150 for defining a location for mounting components **202*a*, 202*b*, 202*c*, 202*d*, 202*e*, 202*f* (FIGS. 10 and 12A-12D) inside the housing body 150. The component compartment 182 extends the length of the housing body 150 and includes a plurality of mounting holes 184 for receiving fasteners (e.g., fasteners 185 in FIG. 10) to secure the components 202*a*, 202*b*, 202*c*, 202*d*, 202*e*, 202*f* (FIGS. 10 and 12A-12D) to the housing body 150. Holes 188 are positioned about the periphery of the component compartment 182. The holes 188 are positioned and dimensioned to align with holes 128 in the plate 116 to receive fasteners 132**, as described in detail below.

A groove 192 extends about a periphery of the component compartment 182. The groove 192 is dimensioned to receive a seal or gasket 194 (FIG. 13A) configured to correspond to a shape of the groove 192 to provide a water-tight as well as a dust-tight enclosure around the components **202*a*, 202*b*, 202*c*, 202*d*, 202*e*, 202*f* mounted in the component compartment 182 when the light engine 110 is secured to the housing body 150, as described in detail below. The seal or gasket 194 may be configured to protect the components 202*a*, 202*b*, 202*c*, 202*d*, 202*e*, 202*f* and any associated wiring or electrical components from particulates, moisture, and any other unwanted debris or contaminants. The gasket 194 can be arranged directly on the plate 116 or can be arranged within the groove 192 machined into the housing body 150 or a groove (not shown) machined into an adjoining surface of the plate 116**.

Referring to FIGS. 10 and 12A-12D, various components **202*a*, 202*b*, 202*c*, 202*d*, 202*e*, 202*f* may be mounted in the component compartment 182, as needed. Further, a component 204 may be threaded into the mounting port 178, as needed. Various fasteners 185 may be used to secure the components 202*a*, 202*b*, 202*c*, 202*d*, 202*e*, 202*f* to the mounting holes 184 (FIG. 9) in the component compartment 182 (FIG. 9**).

Figure 13A:
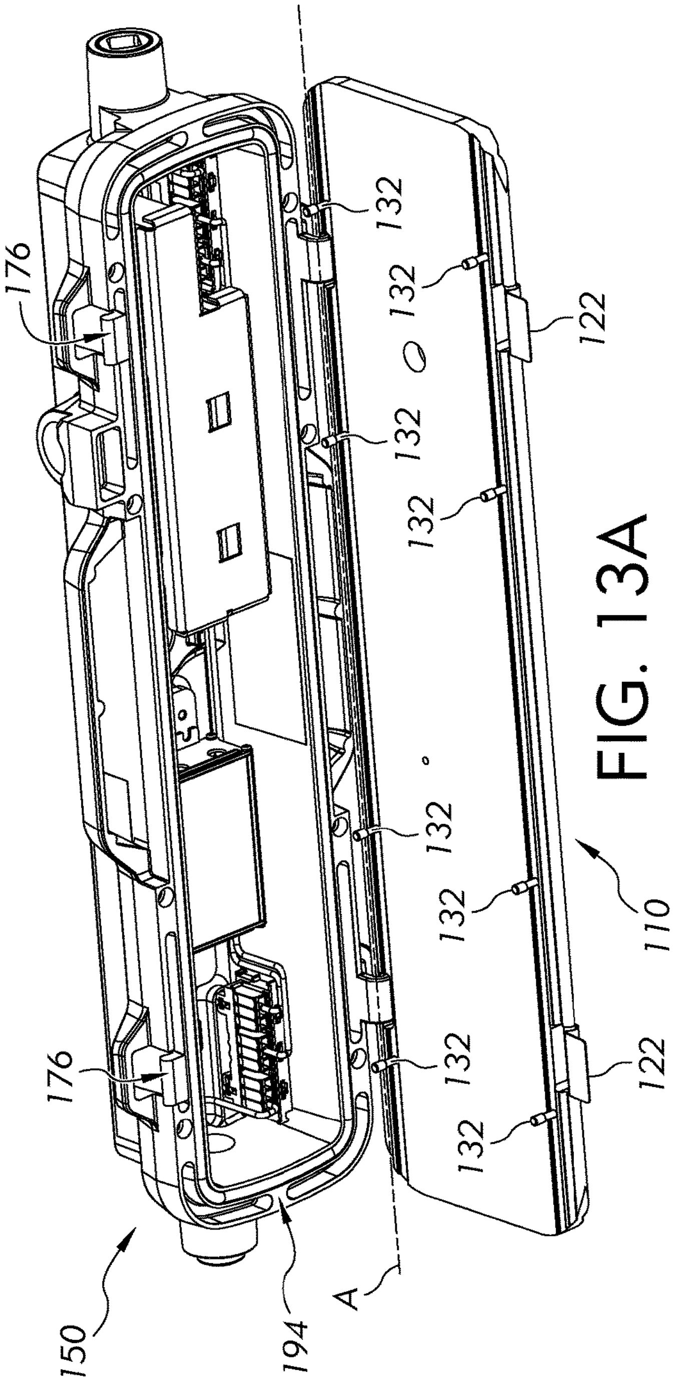
FIG. 13A is a perspective view of the linear light fixture of FIG. 1, showing the light engine in an open position.
Figure 13B:
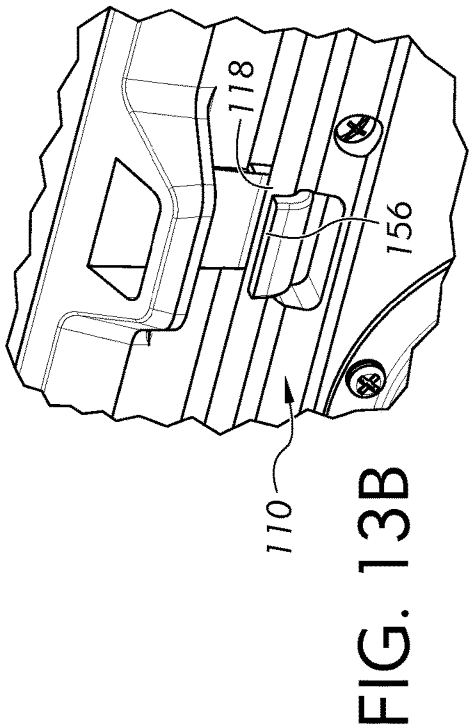
FIG. 13B is an enlarged view of a hinge and hinge pin of the linear light fixture of FIG. 1.

After the desired components **202*a*, 202*b*, 202*c*, 202*d*, 202*e*, 202*f* are secured in the component compartment 182, the light engine 110 is attached to the housing body 150 to enclose the components 202*a*, 202*b*, 202*c*, 202*d*, 202*e*, 202*f* stored in the component compartment 182. Referring to FIGS. 13*a* and 13*b*, the light engine 110 is positioned such that the hinge pins 118 (FIG. 13B) of the light engine 110 are placed in the hinges 156. FIG. 13*b* illustrates the hinge pin 118 received in the hinges 156. The hinge pins 118 (FIG. 13B) are dimensioned and positioned to axially align with each other and with the pivot axis A of the housing body 150. In this respect, the light engine 110 is pivotable between a first open position (FIG. 13A) and a second locked position (FIG. 1). Once positioned in the hinges 156 the light engine 110 is suspended from the housing body 150, i.e., the light engine 110 is in the first open position. With the light engine 110 suspended from the housing body 150, the user may then complete any necessary electrical connections between the light engine 110 and the components 202*a*, 202*b*, 202*c*, 202*d*, 202*e*, 202*f* in the component compartment 182**.

Figure 14B:
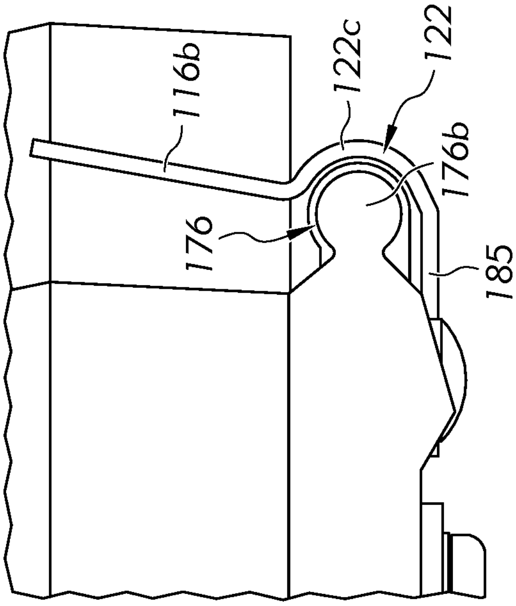
FIG. 14B is an enlarged view of the latch of FIG. 14A, showing the latch in a lock position.
Figure 14A:
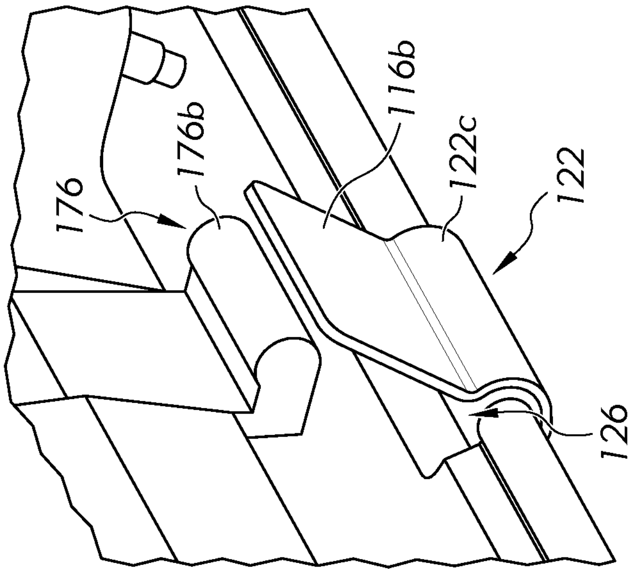
FIG. 14A is an enlarged view of a latch of the linear light fixture of FIG. 1, showing the latch near a lock position.

Prior to sealing the light engine 110 to the housing body 150, the seal or gasket 194 is placed in the groove 192. The seal or gasket 194 may be configured to fit tightly within the groove 192 so that a user is not required to hold the seal or gasket 194 therein during the assembly of the linear light fixture 100. With the seal or gasket 194 secured in the groove 192, the light engine 110 is pivoted such that the latches 122 approach the latching tab 176, as illustrated in FIG. 14*a*. As the latch 122 approaches the latching tab 176, the second leg 122*b* of the latch 122 engages the latching tab 176. The force from the user as the light engine 110 is pivoted toward the housing body 150 causes the second leg 122*b* of the latch 122 to deflect away from the latching tab 176. The second leg 122*b* continues to deflect until the protrusion 176*b* on the latching tab 176 can pass the second leg 122*b* and be received into the central section 122*c*. Once the protrusion 176*b* is in the central section 122*c*, the latch 122 returns to its original shape such that the central section 122*c* snaps around the latching tab 176. At the same time, the protrusion 176*b* on the latching tab 176 is received into the pocket 126 formed between the latch 122 and the notch 124 in the plate 116. The pocket 126 is configured to allow the plate 116 to be positioned in registry with the surface of the housing body 150. Once secured around the latching tab 176 the latch 122 locks the light engine 110 in the second locked position (FIG. 1).

The present invention is configured such that the latches 122 and the hinge 156 are sufficient to hold the light engine 110 proximate the open face of the housing body 150 without further support from the user. With the light engine 110 now supported, the user, if working alone, can use two hands to fasten the light engine 110 to the housing body 150. In particular, when the plate 116 is positioned adjacent the open face of the housing body 150, the fasteners 132 (FIG. 13A) in the plate 116 are positioned and dimensioned to align with the holes 188 (FIG. 9) in the housing body 150 such that the fasteners 132 in the plate 116 may thread into the holes 188 (FIG. 9). As the fasteners 132 (FIG. 13A) are tightened, the force exerted by the fasteners 132 (FIG. 13A) draws the surface of the plate 116 against the open face of the housing body 150 thereby compressing the seal or gasket 194 disposed about the component compartment 182 (FIG. 9). The fasteners 132 (FIG. 13A) may be tightened to a predetermined torque that is selected to be sufficient to seal the component compartment 182 (FIG. 9) from the surrounding environment.

Figure 15B:
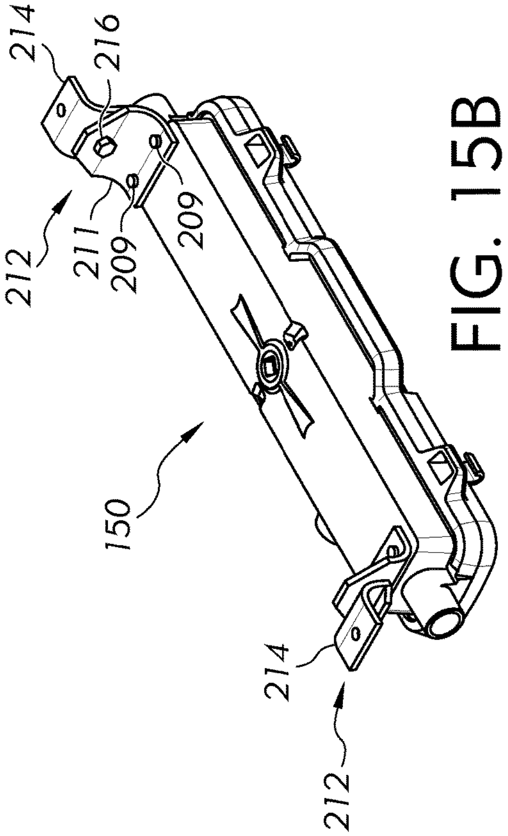
FIG. 15B is a perspective view of an offset ceiling swivel mount attached to the linear light fixture of FIG. 1.
Figure 15A:
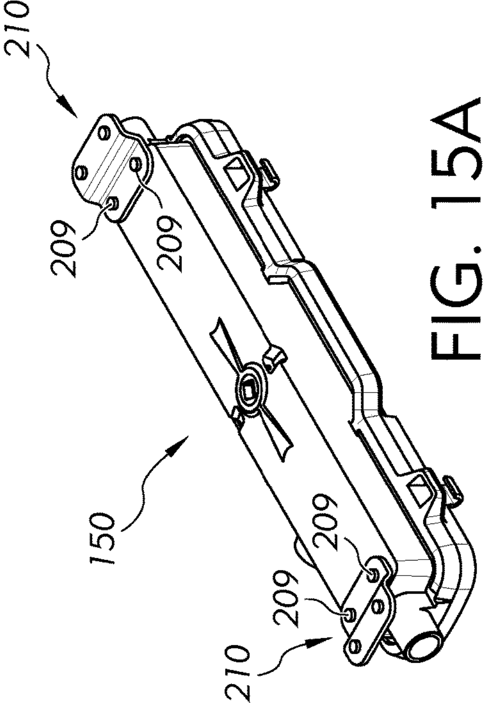
FIG. 15A is perspective view of a ceiling flush mount attached to the linear light fixture of FIG. 1.
Figure 15C:
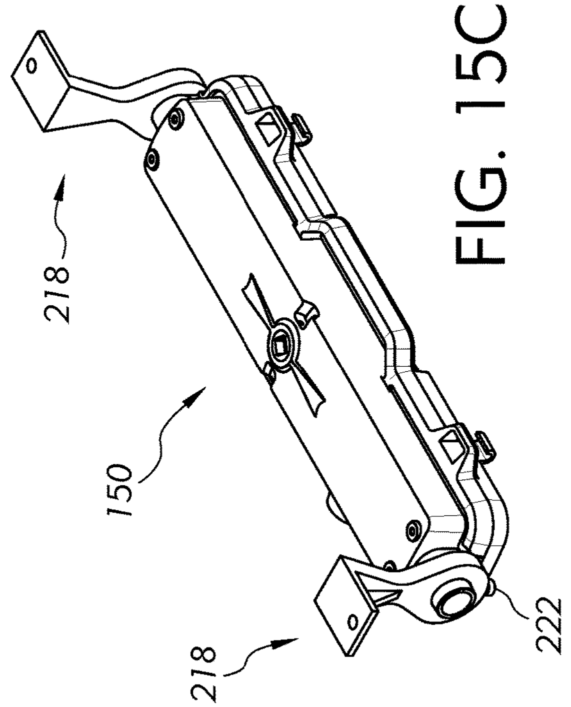
FIG. 15C is a perspective view of an offset hub attached to the linear light fixture of FIG. 1.

Referring to FIGS. 15A-15F, the linear light fixture 100 is illustrated with various mounting components for securing the linear light fixture 100 at a desired location. FIG. 15A illustrates an L-shaped bracket 210 that is attached to each end of the housing body 150. Fasteners 209 are provided for securing the bracket 210 to the holes 164 disposed in pairs on each end 162*a*, 162*b* of the housing body 150. The bracket 210 is also referred to as a ceiling flush mount bracket due to the bracket positioning the linear light fixture 100 flush to a ceiling (not shown). FIG. 15B illustrates an adjustable bracket assembly 212 that includes a base 211 that if fixed to the holes 164 (FIG. 8) on the housing body 150 by fasteners 209. The base 211 includes a vertical leg that is attached to a bracket 214 via a pivot element 216. The pivot element 216 allows the position of the bracket 214 to be adjusted relative to the base 211 for ease of mounting on surfaces that may be uneven. The bracket 214 is also referred to as an offset ceiling swivel due to the bracket assembly 212 offsetting the linear light fixture 100 from a ceiling (not shown) and allowing the linear light fixture 100 to swivel about the pivot element 216. FIG. 15C illustrates end-mounting brackets 218 that are secured about hubs 158 at the ends 162*a*, 162*b* of the housing body 150. An opening extends through each end-mounting bracket 218 and is dimensioned to receive a respective hub 158. A set screw 222 is provided for securing the end-mounting bracket 218 to the respective hub 158. The bracket 218 is also referred to as an offset hub bracket due to the bracket 218 being secured to the hubs 158 that extend from the ends of the housing body 150.

Figure 15E:
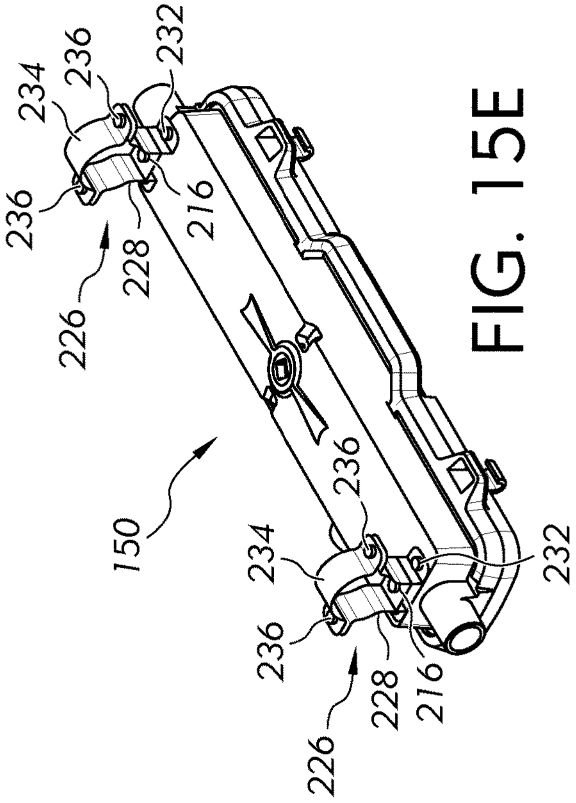
FIG. 15E is a perspective view of a pole mount attached to the linear light fixture of FIG. 1.
Figure 15D:
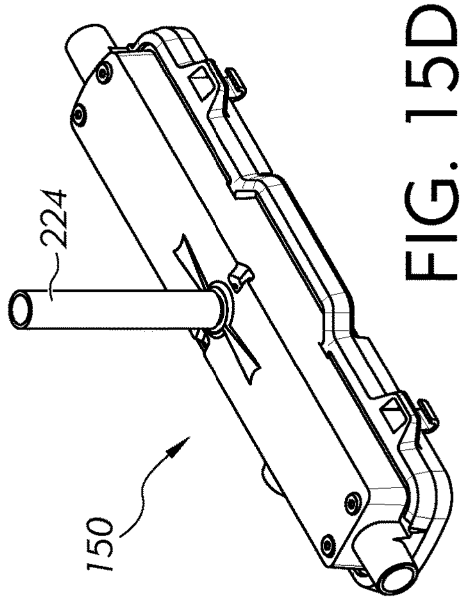
FIG. 15D is a perspective view of a pendant mount attached to the linear light fixture of FIG. 1.
Figure 15F:
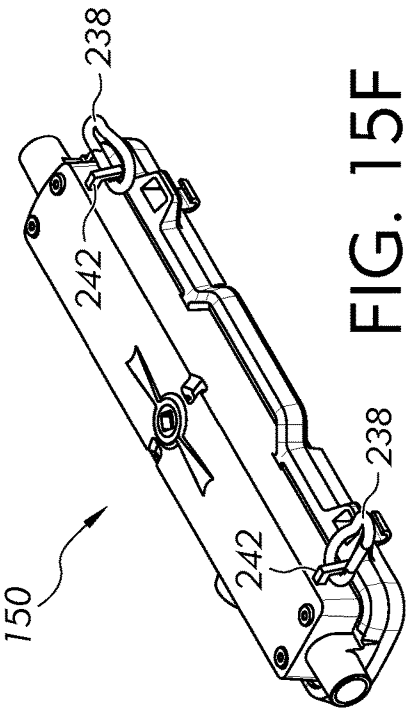
FIG. 15F is a perspective view of a safety cable attachment on the linear light fixture of FIG. 1.

FIG. 15D illustrates a conduit 224 that is threaded into the threaded opening 166 on the top surface of the housing body 150. The conduit 224 may define a path for electrical cables to pass into the component compartment 182 of the housing body 150. The conduit 224 is also referred to as a pendant mount. FIG. 15E illustrates a conduit-mounting clip 226 that is attached to each end of the housing body 150. Each clip 226 includes a base 228 that is secured to the top of the housing body 150 via fasteners 232. A mating part 234 is attached view fasteners 236 to the base 228 and are configured to apply sufficient force to clamp the clip 226 to a conduit (not shown), as conventionally known in the art. The conduit-mounting clip 226 is also referred to as a pole mount. FIG. 15F illustrates a safety cable attachment 238 that is configured to secure to an integral eyelet 242 of the housing body 150. The integral eyelet 242 may be machined into the housing body 150 to serve as a secondary retention point or redundant safety connection. For example, one end of one or more safety cables or lanyards (not shown) can be attached to or through the integral eyelet 242 and another end of the cables can be secured to a structure onto which the linear light fixture 100 and the mounting hardware are attached, such as a wall or ceiling. In the event the mounting hardware comes loose (e.g. due to vibration, shock, or contact) or breaks and fails to securely attach the linear light fixture 100 to the structure, the cable will hold the linear light fixture 100 in proximity to the structure at a length of the cable. Thus, the linear light fixture 100 will not fall onto a person or object causing injury to the person or object and or damage to the linear light fixture 100. Multiple integral eyelets 242 can be machined into the housing body 150, for example at each corner of the housing body 150, to provide additional redundant safety connections.

Figure 16:
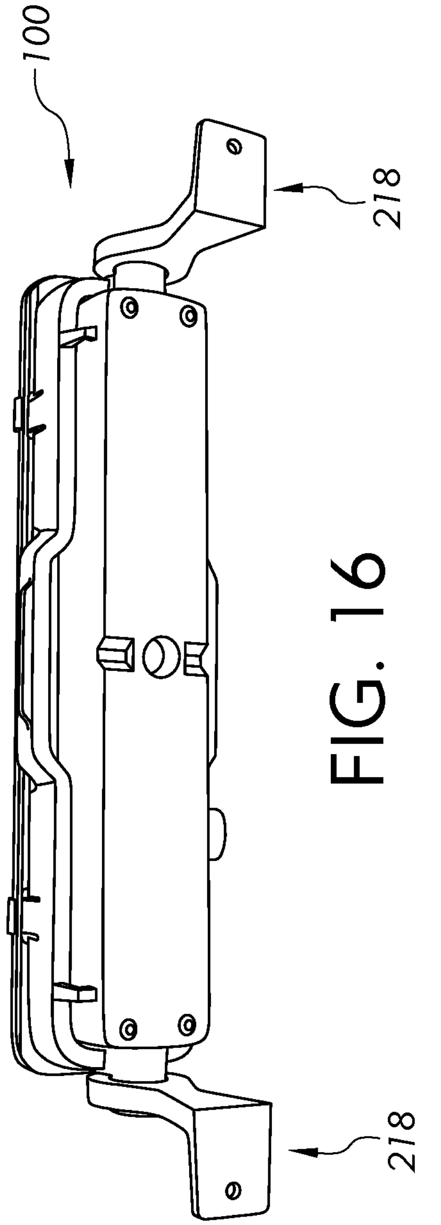
FIG. 16 is an illustration of a user carrying the linear light fixture of FIG. 1 by a handle.
Figure 17:
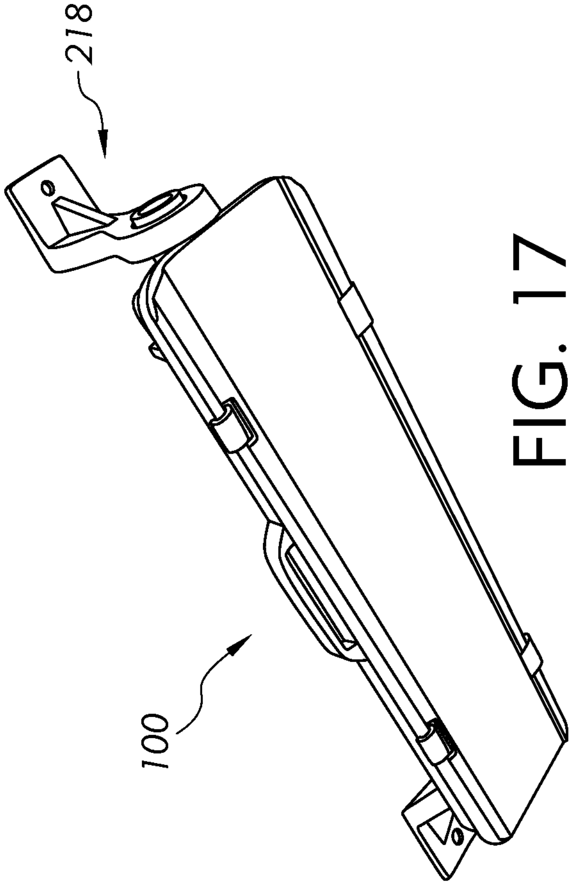
FIG. 17 is an illustration of a user mounting the linear light fixture of FIG. 1 using two handles.
Figure 18:
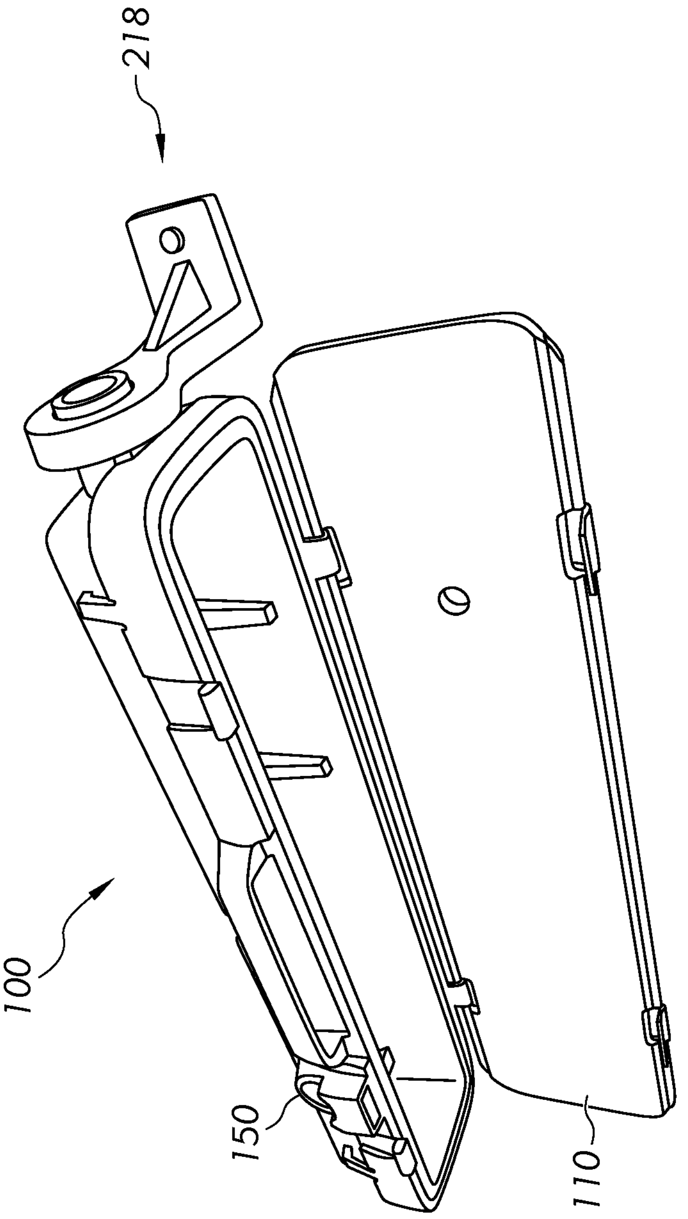
FIG. 18 is an illustration of the linear light fixture of FIG. 1 secured to a wall.

Referring to FIG. 16, it is contemplated that after the linear light fixture 100 is completely assembled, or before any one or more of the light engine 110, the internal components 202*a*, 202*b*, 202*c*, 202*d*, 202*e*, 202*f* and the respective fasteners 185 are attached to the housing body 150, that a user may carry the housing body 150 to the place of installation using the handles 154, 174. The handles 154, 174 may be configured to provide enough space so that the hand of a typical user can grip the handle 154, 174 to carry the housing body 150 to the place of installation. As illustrated in FIG. 17, the handles 154, 174 may also provide convenient locations for one user to hold the housing body 150 while another user (not shown) secures the housing body 150 to the desired location. FIG. 18 illustrates a mock-up of a housing body 150 with the plate 116 of the light engine 110 showing one possible mounting arrangement for the linear light fixture 100 using end-mounting brackets 218.

Figure 19:
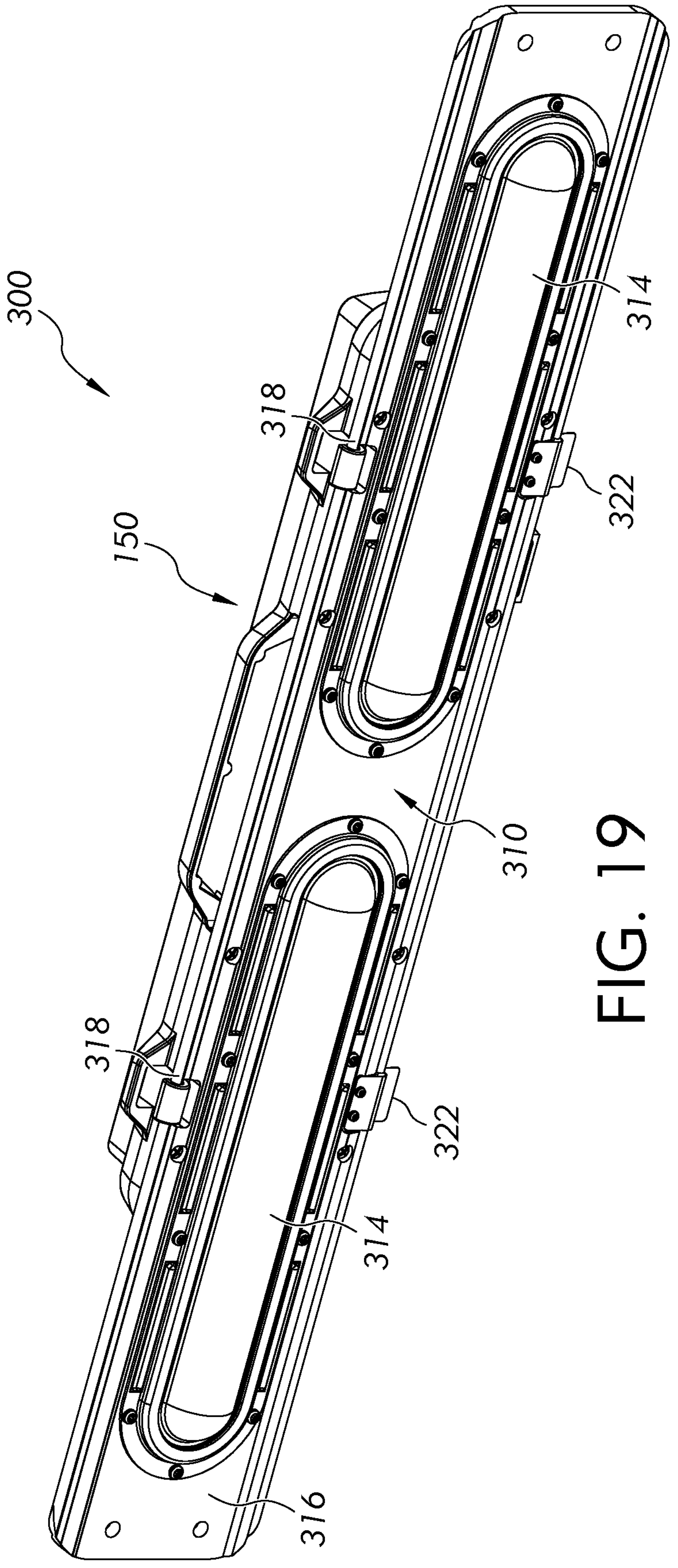
FIG. 19 is a bottom perspective view of a linear light fixture according to a second embodiment.
Figure 20:
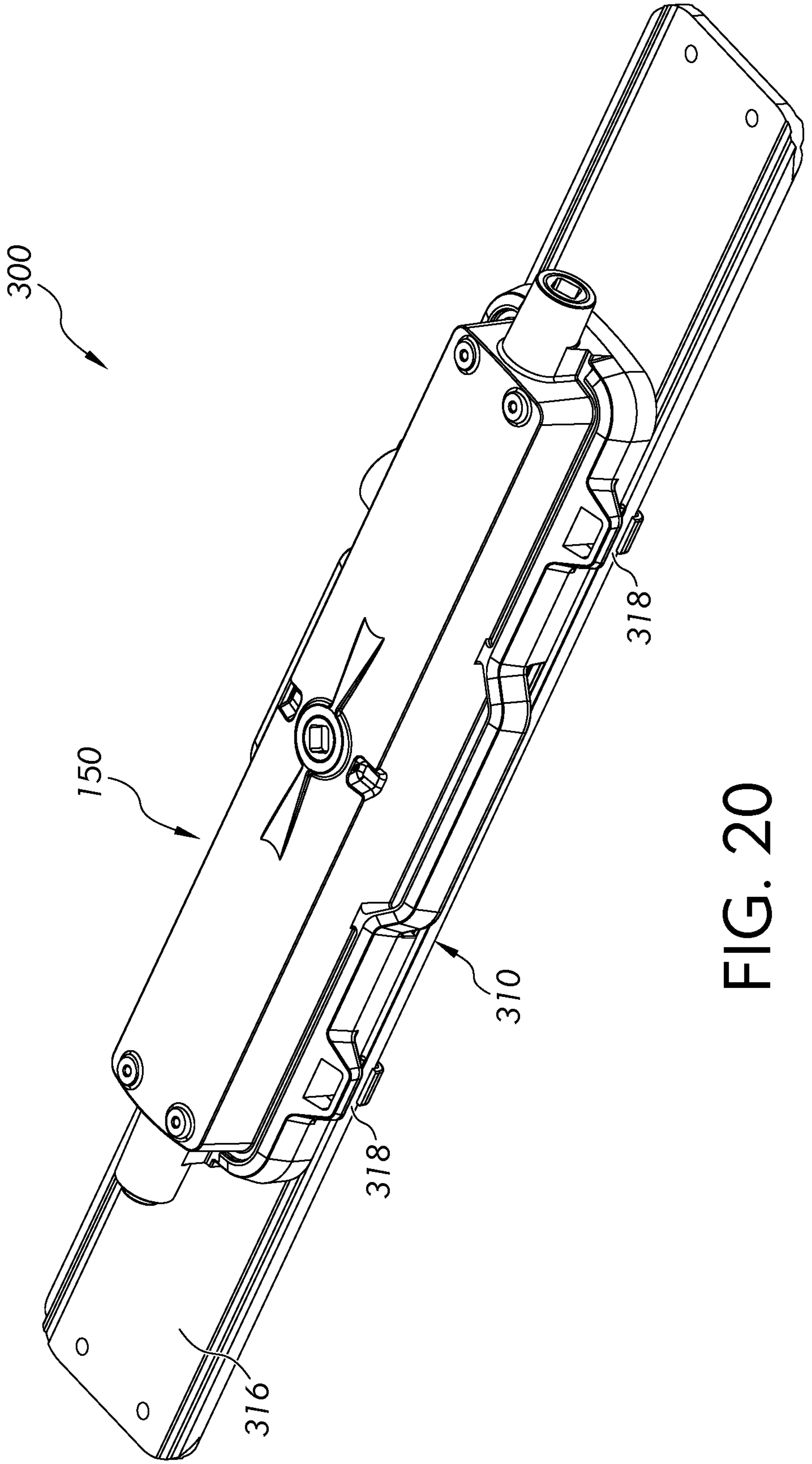
FIG. 20 is a top perspective view of the linear light fixture of FIG. 19.
Figure 21:
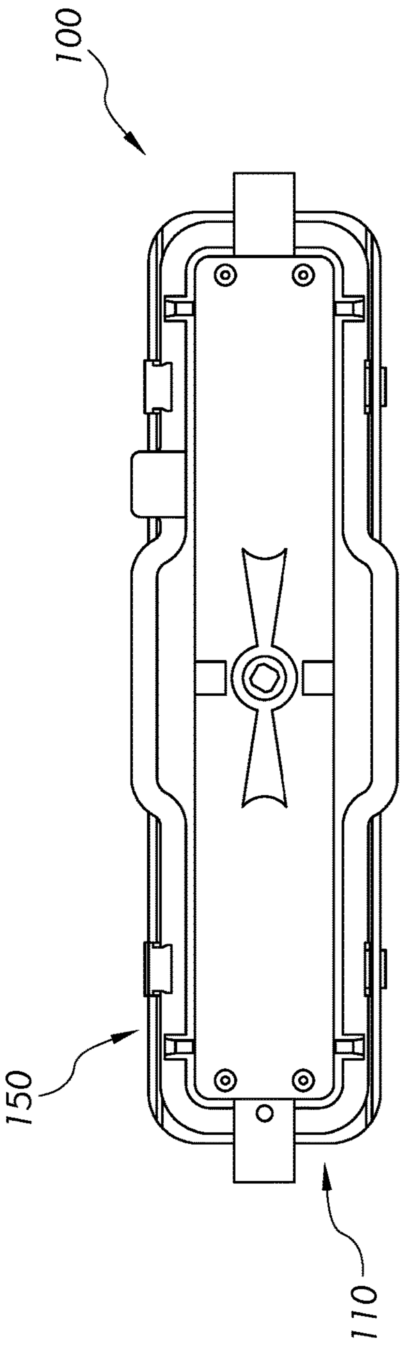
FIG. 21 is a top plane view of the linear light fixture of FIG. 1, according to a first embodiment.
Figure 22:
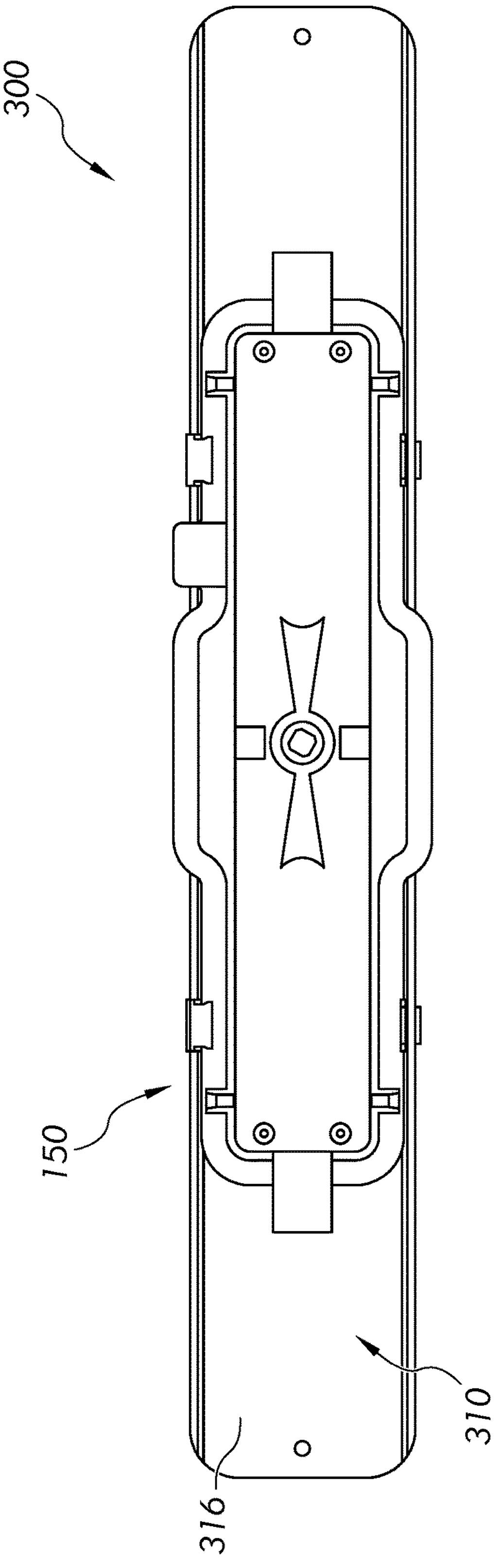
FIG. 22 is a top plane view of the liner light fixture of FIG. 19, according to a second embodiment.

The embodiment of the linear light fixture 100 described in detail above is for a light engine 110 with a single lens 114. As illustrated in FIGS. 19 and 20, the housing body 150 may also be used with a light engine 310 with a two lens 314 to form a linear light fixture 300, according to second embodiment. The light engine 310 includes mounting features, i.e., a hinge pin 318 and a latch 322 that are similar to the hinge pin 118 and the latch 122 of the light engine 110 described in detail above. Accordingly, the light engine 310 will not be described in detail. FIGS. 21 and 22 are top views of the linear light fixture 100 and the linear light fixture 300 wherein the light engine 110 and the light engine 310 are mounted to respective housing bodies 150. Aside from having two light sources and a longer plate 316, the light engine 310 is similar to the light engine 110 and will not be described in detail.

As noted above, the housing body 150 may attach to a light engine with a single lens (light engine 110) or a light engine with two lenses (light engine 310). In this respect, the housing body 150 is configured such that a user can easily switch between light engines 110 and 310 without needing to change the housing body 150. Therefore, once the housing body 150 is attached to a structure, a user may easily and quickly change the light engines, and thereby provide more or less light by simply exchanging one light engine for another.

The housing body 150 also allows the user to replace quickly and easily the light engine in the case of a failure of the same. To remove the light engine, the user disengages the fasteners 132 from the housing body 150 and deflects the latches 122 so that the light engine can pivot from the locked position to the open position. Once the light engine is in the open position, the user may disconnect the electrical cables between the light engine and the components in the housing body 150. Thereafter, the user may remove the light engine from the hinges 156 and replace the light engine with a replacement, in the same manner described in detail above.

Moreover, the housing body 150 is configured to allow a user easy access to the components stored in the component compartment of the housing body 150. To gain access to the component compartment 182, the user disengages the fasteners 132 from the housing body 150 and deflects the latches 122 so that the light engine can pivot from the locked position to the open position. Once the light engine is in the open position, the user has full access to the components in the component compartment while the light engine remains attached to the housing body 150 and out of the way of the user.

The housing body 150, the plate 116 and the seal or gasket 194 are configured to provide a sealed enclosure around the component compartment 182. In particular, the mating surfaces of the housing body 150 and the plate 116 are machined to be flat or planar. Therefore, when mounted together, these flat or planar mating surfaces provide a uniformly tight interface between the housing body 150 and the plate 116.

It is contemplated that the light engine 110 may be a sealed replaceable component such that a user can easily replace one light engine for another without completely disassembling the linear light fixture 100. The linear light fixture 100 may be designed to include no excessively heated surfaces and the electrical components 202*a*, 202*b*, 202*c*, 202*d*, 202*e*, 202*f* may be selected to be limited in their ability to produce an arcing event to trigger an ignition inside the linear light fixture 100. It is contemplated that the linear light fixture 100 may be designed to operate in the National Electric Code (NEC)/Canadian Electric Code (CEC) rated, Class 1, Division 2 environment wherein non-arcing, non-sparking and temperature limited rules apply.

The housing body 150 may be formed as a single housing made from die cast aluminum. A single housing is to be understood, therefore, as a component (e.g. a metallic component extruded out of aluminum alloy) that has integral features formed therein. For example, the housing body 150 may cast and subsequently machined. Such a process provides a housing body 150 that is a single piece part including integral structural features that are structurally rigid and capable of withstanding the aforementioned temperatures and pressures to which the linear light fixture 100 may be exposed when employed in hazardous or harsh locations.

It will be apparent to those skilled in the art that various modifications and variations can be made without departing from the spirit and scope of the claimed invention.

What is claimed is:

1. A linear light fixture for use in a hazardous environment, the linear light fixture comprising:

a housing body defining a component compartment therein configured to receive electrical components, wherein the housing body includes opposite first and second sides extending longitudinally between opposite first and second ends thereof, and wherein a first handle is provided at one of the first and second sides of the housing body; and a light engine connected to the housing body and including a light emitting diode, the light engine being pivotable with respect to the housing body between a first position, wherein the light engine encloses the component compartment, and a second position, wherein access is provided to the component compartment, wherein the light engine is separable from the housing body, and wherein the light engine is pivotably attached to the housing body at the first side thereof.

2. The linear light fixture of claim 1, wherein the light engine includes a sealed housing for isolating the light emitting diode from the hazardous environment.

3. The linear light fixture of claim 1, wherein the light engine includes a plate having first and second opposite sides, wherein the first side of the light engine is pivotably connected to the housing body, and wherein a notch is formed at the second opposite side of the plate.

4. The linear light fixture of claim 3, wherein the housing body includes a latching tab extending outwards therefrom.

5. The linear light fixture of claim 1, wherein a second handle is provided at the other of the first and second sides of the housing body.

6. The linear light fixture of claim 1, wherein the light engine is selectively locked in the first position via a latch such that the latch prevents the light engine from pivoting towards the second position.

7. The linear light fixture of claim 1, wherein a hollow hub is provided at one of the first and second ends of the housing body and is configured to receive an electrical conduit therein.

8. The linear light fixture of claim 1, wherein a hinge is provided at a side of the housing body and defines a pivot axis.

9. The linear light fixture of claim 8, wherein the light engine includes a plate, and wherein a hinge pin is provided at a side of the plate.

10. The linear light fixture of claim 9, wherein the hinge pin is removably received within the hinge such that the light engine is pivotable about the pivot axis between the first position and the second position.

11. The linear light fixture of claim 9, wherein the plate includes opposite first and second surfaces, the light emitting diode being provided on the first surface, and the second surface facing the component compartment when the light engine is in the first position.

12. The linear light fixture of claim 10, wherein the hinge pin is defined by a through-hole formed in the plate and disposed adjacent thereto.

13. The linear light fixture of claim 12, wherein the hinge includes a vertical portion extending from the housing body and a curved portion at a distal end thereof, wherein the vertical portion of the hinge extends within the through-hole formed in the plate when the light engine is in the first position, and wherein the curved portion partially wraps around the hinge pin.

14. A linear light fixture for use in a hazardous environment, the linear light fixture comprising:

a housing body defining a component compartment therein configured to receive electrical components; and a light engine connected to the housing body and including a light emitting diode, the light engine being pivotable with respect to the housing body between a first position, wherein the light engine encloses the component compartment, and a second position, wherein access is provided to the component compartment, wherein the light engine is separable from the housing body, wherein the light engine includes a plate having first and second opposite sides, wherein the first side of the light engine is pivotably connected to the housing body, and wherein a notch is formed at the second side, wherein the housing body includes a latching tab extending outwards therefrom, and wherein when the light engine is in the first position, the latching tab is received within the notch formed at the second side of the plate.

15. The linear light fixture of claim 14, wherein the notch is a cut-out formed at an edge of the second side of the plate.

16. The linear light fixture of claim 14, further comprising a latch secured to the plate, the latch and the notch collectively defining a pocket, wherein the pocket is configured to receive a protrusion of the latching tab.

17. The linear light fixture of claim 16, wherein the latch is resiliently movable such that as the light engine pivots from the second position to the first position, the latch is moved away from the plate via a force imparted by the protrusion of the latching tab.

18. A linear light fixture for use in a hazardous environment, the linear light fixture comprising:

a housing body extending along a longitudinal axis and defining a component compartment therein, said component compartment being configured to receive electrical components, the housing body comprising:

first and second opposite sides extending along the longitudinal axis between first and second opposite ends of the housing body;

a hinge provided at the first side of the housing body and defining a pivot axis; and a latching tab provided at the second side of the housing body;

a light engine removably connected to the housing body, the light engine comprising:

a plate having first and second opposite sides extending between first and second opposite ends thereof, wherein a notch is formed at the second side of the plate;

a light emitting diode provided on a first surface of the plate; and a hinge pin provided at the first side of the plate, wherein the hinge pin is removably received within the hinge such that the light engine is pivotable about the pivot axis between a first position, wherein the plate encloses the component compartment, and a second position, wherein access is provided to the component compartment, wherein when the light engine is in the first position, the latching tab is received within the notch, and wherein the plate includes a second surface, opposite to the first surface, that faces the component compartment when the light engine is in the first position.

* * * * *